(12) United States Patent
Basu et al.

(10) Patent No.: US 9,708,473 B2
(45) Date of Patent: Jul. 18, 2017

(54) CELLULOSE ESTERS IN PNEUMATIC TIRES

(71) Applicant: Eastman Chemical Company, Kingsport, TN (US)

(72) Inventors: Soumendra Kumar Basu, Johnson City, TN (US); Bradley James Helmer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/690,935

(22) Filed: Nov. 30, 2012

(65) Prior Publication Data

US 2013/0150494 A1 Jun. 13, 2013

Related U.S. Application Data

(60) Provisional application No. 61/567,950, filed on Dec. 7, 2011, provisional application No. 61/567,948, filed on Dec. 7, 2011, provisional application No. 61/567,953, filed on Dec. 7, 2011, provisional application No. 61/567,951, filed on Dec. 7, 2011.

(51) Int. Cl.
| | |
|---|---|
| *C08L 1/10* | (2006.01) |
| *C08L 1/12* | (2006.01) |
| *C08J 3/20* | (2006.01) |
| *C08K 13/08* | (2006.01) |
| *C08L 1/14* | (2006.01) |

(52) U.S. Cl.
CPC . *C08L 1/12* (2013.01); *C08J 3/20* (2013.01); *C08K 13/08* (2013.01); *C08L 1/10* (2013.01); *C08L 1/14* (2013.01)

(58) Field of Classification Search
CPC .......................................................... C08L 1/10
USPC .............................................................. 524/31
See application file for complete search history.

(56) References Cited

U.S. PATENT DOCUMENTS

| | | | |
|---|---|---|---|
| 1,683,347 A | 9/1928 | Gray et al. | |
| 1,698,049 A | 1/1929 | Clarke et al. | |
| 1,880,560 A | 10/1932 | Webber et al. | |
| 1,880,808 A | 10/1932 | Clarke et al. | |
| 1,973,398 A | 9/1934 | Trolander et al. | |
| 1,984,147 A | 12/1934 | Malm | |

(Continued)

FOREIGN PATENT DOCUMENTS

| | | |
|---|---|---|
| CN | 101186716 | 5/2008 |
| EP | 0236861 A2 | 2/1987 |

(Continued)

OTHER PUBLICATIONS

Encyclopedia of Polymer Science and Technology ("Plasticizers", 2011, John Wiley & Sons, p. 6).*

(Continued)

*Primary Examiner* — Lanee Reuther
(74) *Attorney, Agent, or Firm* — Polly C. Owen

(57) ABSTRACT

A tire component is provided comprising an elastomeric composition containing at least one non-fibril cellulose ester, at least one non-nitrile primary elastomer, optionally a starch, and at least 70 parts per hundred rubber (phr) of one or more fillers, wherein the weight ratio of the cellulose ester to the starch is at least 3:1, and wherein the cellulose ester is in the form of particles having an average diameter of not more than 10 μm.

19 Claims, 1 Drawing Sheet

(56) References Cited

U.S. PATENT DOCUMENTS

| | | |
|---|---|---|
| 2,076,781 A | 4/1937 | Jacobsen |
| 2,129,052 A | 9/1938 | Fordyce |
| 2,138,392 A | 11/1938 | Weingand |
| 3,220,865 A | 11/1965 | Coney |
| 3,462,328 A | 8/1969 | Buckland |
| 3,522,070 A | 7/1970 | Webb, Jr. |
| 3,617,201 A | 11/1971 | Berni et al. |
| 3,668,157 A * | 6/1972 | Combs et al. ............ 524/37 |
| 3,878,137 A | 4/1975 | Hess et al. |
| 3,922,239 A | 11/1975 | Koleske et al. |
| 3,959,193 A | 5/1976 | Putman et al. |
| 4,007,144 A | 2/1977 | Sanders et al. |
| 4,009,030 A | 2/1977 | Abel |
| 4,094,695 A | 6/1978 | Sanders |
| 4,098,734 A | 7/1978 | Lee |
| 4,104,210 A | 8/1978 | Coran et al. |
| 4,111,535 A | 9/1978 | Loshaek et al. |
| 4,141,863 A | 2/1979 | Coran et al. |
| 4,147,603 A | 4/1979 | Pacifici et al. |
| 4,156,677 A | 5/1979 | Williams et al. |
| 4,166,809 A | 9/1979 | Brewer et al. |
| 4,243,769 A | 1/1981 | Pritchett |
| 4,269,629 A | 5/1981 | Zannucci |
| 4,358,553 A * | 11/1982 | Coran et al. .............. 524/37 |
| 4,443,595 A | 4/1984 | Namikoshi et al. |
| 4,499,043 A | 2/1985 | Yabe et al. |
| 4,506,045 A | 3/1985 | Waniczek et al. |
| 4,517,324 A | 5/1985 | Luhmann et al. |
| 4,604,425 A | 8/1986 | Ohmura et al. |
| 4,758,645 A | 7/1988 | Miyazono et al. |
| 4,801,632 A | 1/1989 | Eichenauer et al. |
| 4,839,230 A | 6/1989 | Cook |
| 4,861,629 A | 8/1989 | Nahm |
| 4,895,884 A | 1/1990 | Benko et al. |
| 4,926,920 A | 5/1990 | Gouttebessis et al. |
| 4,959,404 A | 9/1990 | Nakane et al. |
| 4,970,247 A | 11/1990 | Hoppe et al. |
| 4,983,730 A | 1/1991 | Domeshek et al. |
| 5,011,874 A | 4/1991 | Hoppe et al. |
| 5,047,180 A | 9/1991 | Steiner et al. |
| 5,073,581 A | 12/1991 | Covelli et al. |
| 5,077,338 A | 12/1991 | Tung et al. |
| 5,082,914 A | 1/1992 | Cook et al. |
| 5,104,450 A | 4/1992 | Sand et al. |
| 5,166,233 A | 11/1992 | Kuroya et al. |
| 5,182,379 A | 1/1993 | Cook et al. |
| 5,219,510 A | 6/1993 | Machell et al. |
| 5,256,453 A | 10/1993 | Heithorn et al. |
| 5,279,659 A | 1/1994 | Nishiura et al. |
| 5,281,647 A | 1/1994 | Eapen |
| 5,286,768 A | 2/1994 | Walker |
| 5,288,318 A | 2/1994 | Mayer et al. |
| 5,290,830 A | 3/1994 | Tung et al. |
| 5,292,783 A | 3/1994 | Buchanan et al. |
| 5,292,877 A | 3/1994 | Edgar et al. |
| 5,302,637 A | 4/1994 | Landry et al. |
| 5,374,671 A | 12/1994 | Corvasce et al. |
| 5,376,708 A | 12/1994 | Best et al. |
| 5,384,163 A | 1/1995 | Budde et al. |
| 5,393,333 A | 2/1995 | Trouve |
| 5,393,476 A | 2/1995 | Suzuki |
| 5,405,666 A * | 4/1995 | Brindle ................ 428/36.4 |
| 5,441,998 A | 8/1995 | Teeters et al. |
| 5,446,079 A | 8/1995 | Buchanan et al. |
| 5,478,386 A | 12/1995 | Itoh et al. |
| 5,480,922 A | 1/1996 | Mulhaupt et al. |
| 5,536,778 A | 7/1996 | Kreckel et al. |
| 5,545,680 A | 8/1996 | Corvasce et al. |
| 5,559,171 A | 9/1996 | Buchanan et al. |
| 5,576,104 A | 11/1996 | Causa et al. |
| 5,580,911 A | 12/1996 | Buchanan et al. |
| 5,585,181 A | 12/1996 | Meraldi et al. |
| 5,587,238 A | 12/1996 | Meraldi et al. |
| 5,593,487 A | 1/1997 | Meraldi et al. |
| 5,594,068 A | 1/1997 | Buchanan et al. |
| 5,599,858 A | 2/1997 | Buchanan et al. |
| 5,609,677 A | 3/1997 | Itoh et al. |
| 5,624,975 A | 4/1997 | Valencia |
| 5,631,078 A | 5/1997 | Ellery et al. |
| 5,656,682 A | 8/1997 | Rimsa et al. |
| 5,663,310 A | 9/1997 | Shimoda et al. |
| 5,672,639 A | 9/1997 | Corvasce et al. |
| 5,698,612 A | 12/1997 | Simon et al. |
| 5,705,632 A | 1/1998 | Shimoda et al. |
| 5,707,737 A | 1/1998 | Mori et al. |
| 5,717,022 A | 2/1998 | Beckmann et al. |
| 5,720,803 A | 2/1998 | Itoh et al. |
| 5,720,804 A | 2/1998 | Martin |
| 5,723,151 A | 3/1998 | Cook et al. |
| 5,741,901 A | 4/1998 | Cook et al. |
| 5,750,677 A | 5/1998 | Edgar et al. |
| 5,753,140 A | 5/1998 | Shigemura |
| 5,766,752 A | 6/1998 | Cox et al. |
| 5,804,296 A | 9/1998 | Itoh et al. |
| 5,806,834 A | 9/1998 | Yoshida |
| 5,844,023 A | 12/1998 | Tomka |
| 5,856,468 A | 1/1999 | Shuto et al. |
| 5,871,573 A | 2/1999 | Cook et al. |
| 5,880,278 A | 3/1999 | Huston et al. |
| 5,910,544 A | 6/1999 | Ozawa et al. |
| 5,928,777 A | 7/1999 | Cox et al. |
| 5,938,869 A | 8/1999 | Kaido et al. |
| 5,973,139 A | 10/1999 | Lee et al. |
| 5,977,347 A | 11/1999 | Shuto et al. |
| 5,981,738 A | 11/1999 | Cook et al. |
| 6,001,484 A | 12/1999 | Horrion et al. |
| 6,010,595 A | 1/2000 | Mitchell et al. |
| 6,022,614 A | 2/2000 | Aubry et al. |
| 6,036,885 A | 3/2000 | Krutak et al. |
| 6,036,913 A | 3/2000 | Shibue et al. |
| 6,046,259 A | 4/2000 | Das et al. |
| 6,062,283 A | 5/2000 | Watanabe et al. |
| 6,063,842 A | 5/2000 | Kwon et al. |
| 6,079,465 A | 6/2000 | Takeyama et al. |
| 6,103,253 A | 8/2000 | Hoffmann et al. |
| 6,107,372 A | 8/2000 | Sakamaki |
| 6,133,439 A | 10/2000 | Buchanan et al. |
| 6,136,123 A | 10/2000 | Kaido et al. |
| 6,139,785 A | 10/2000 | Shuto et al. |
| 6,191,196 B1 | 2/2001 | Willett et al. |
| 6,202,726 B1 | 3/2001 | Corvasce et al. |
| 6,211,358 B1 | 4/2001 | Honda et al. |
| 6,214,907 B1 | 4/2001 | Tomka |
| 6,218,448 B1 | 4/2001 | Kraaijevanger et al. |
| 6,225,381 B1 | 5/2001 | Sharma et al. |
| 6,228,895 B1 | 5/2001 | Buchanan et al. |
| 6,232,285 B1 | 5/2001 | Casteel et al. |
| 6,258,799 B1 | 7/2001 | Kokubo et al. |
| 6,261,689 B1 | 7/2001 | Meraldi et al. |
| 6,269,858 B1 | 8/2001 | Sandstrom |
| 6,273,163 B1 | 8/2001 | Materne et al. |
| 6,274,653 B1 | 8/2001 | Hecht et al. |
| 6,313,202 B1 | 11/2001 | Buchanan et al. |
| 6,320,042 B1 | 11/2001 | Michihata et al. |
| 6,334,919 B1 | 1/2002 | Takeyama et al. |
| 6,345,656 B1 | 2/2002 | Corvasce et al. |
| 6,359,071 B1 * | 3/2002 | Watanabe ............... B60C 1/00 525/184 |
| 6,362,256 B2 | 3/2002 | Willett et al. |
| 6,369,214 B1 | 4/2002 | Tye et al. |
| 6,382,285 B1 | 5/2002 | Mori et al. |
| 6,390,164 B1 | 5/2002 | Beers |
| 6,391,945 B2 | 5/2002 | Sanstrom |
| 6,397,912 B1 | 6/2002 | Watanabe et al. |
| 6,402,867 B1 | 6/2002 | Kaido et al. |
| 6,403,696 B1 | 6/2002 | Barber et al. |
| 6,427,736 B1 | 8/2002 | Meraldi et al. |
| 6,437,023 B1 | 8/2002 | Otaki et al. |
| 6,458,871 B2 | 10/2002 | Materne et al. |
| 6,468,609 B2 | 10/2002 | Marien et al. |
| 6,469,101 B2 | 10/2002 | Nahmias |
| 6,484,773 B1 | 11/2002 | Bruant |
| 6,503,581 B1 | 1/2003 | Shibue et al. |
| 6,506,824 B1 | 1/2003 | Bastioli et al. |

(56) References Cited

U.S. PATENT DOCUMENTS

| | | |
|---|---|---|
| 6,539,996 B1 | 4/2003 | Corvasce et al. |
| 6,548,578 B2 | 4/2003 | Pawlikowski |
| 6,550,508 B1 | 4/2003 | Yamaguchi |
| 6,555,678 B1 | 4/2003 | Allandrieu et al. |
| 6,562,938 B2 | 5/2003 | Haile et al. |
| 6,569,827 B2 | 5/2003 | Van Dijk et al. |
| 6,571,802 B1 | 6/2003 | Yamashita |
| 6,588,470 B2 | 7/2003 | Kanenari et al. |
| 6,600,034 B2 | 7/2003 | Sato et al. |
| 6,617,383 B2 | 9/2003 | Ikawa et al. |
| 6,620,866 B1 | 9/2003 | Obrecht et al. |
| 6,646,066 B2 | 11/2003 | Hahn et al. |
| 6,656,983 B1 | 12/2003 | Mayer et al. |
| 6,683,174 B1 | 1/2004 | Ozaki et al. |
| 6,712,896 B2 | 3/2004 | Ono et al. |
| 6,730,374 B2 | 5/2004 | Gamble et al. |
| 6,731,357 B1 | 5/2004 | Tachibana et al. |
| 6,746,732 B2 | 6/2004 | Gamble et al. |
| 6,773,497 B2 | 8/2004 | Katai |
| 6,800,684 B2 | 10/2004 | Hayashi et al. |
| 6,814,914 B2 | 11/2004 | Tasaka et al. |
| 6,838,511 B2 | 1/2005 | Zanzig |
| 6,844,033 B2 | 1/2005 | Shimizu et al. |
| 6,848,487 B2 | 2/2005 | Weydert et al. |
| 6,872,674 B2 | 3/2005 | Williams et al. |
| 6,872,766 B2 | 3/2005 | Schunk et al. |
| 6,878,760 B2 | 4/2005 | Corvasce et al. |
| 6,881,457 B2 | 4/2005 | Tasaka et al. |
| 6,881,770 B2 | 4/2005 | Mizuno et al. |
| 6,897,303 B2 | 5/2005 | Yamada |
| 6,914,139 B2 | 7/2005 | Mukunoki et al. |
| 6,924,010 B2 | 8/2005 | Fredercik et al. |
| 6,946,519 B2 | 9/2005 | Okubo et al. |
| 6,958,394 B2 | 10/2005 | Saito |
| 6,966,999 B2 | 11/2005 | Tsou et al. |
| 6,974,608 B2 | 12/2005 | Shimizu et al. |
| 6,977,275 B2 | 12/2005 | Buchanan et al. |
| 6,984,631 B2 | 1/2006 | Aranishi et al. |
| 6,984,730 B2 | 1/2006 | Yamada et al. |
| 7,019,130 B2 | 3/2006 | Ito |
| 7,026,470 B2 | 4/2006 | Obie |
| 7,038,744 B2 | 5/2006 | Kuzuhara et al. |
| 7,041,745 B2 | 5/2006 | Lin et al. |
| 7,060,333 B2 | 6/2006 | Takeuchi et al. |
| 7,078,078 B2 | 7/2006 | Ito |
| 7,083,752 B2 | 8/2006 | Bermel |
| 7,102,499 B2 | 9/2006 | Myatt |
| 7,105,212 B2 | 9/2006 | Ito |
| 7,105,213 B2 | 9/2006 | Tasaka et al. |
| 7,117,911 B2 | 10/2006 | Kanenari |
| 7,122,586 B2 | 10/2006 | Sandstrom et al. |
| 7,125,591 B2 | 10/2006 | Nakajima et al. |
| 7,125,918 B2 | 10/2006 | Shimizu et al. |
| 7,148,344 B2 | 12/2006 | Nakanishi et al. |
| 7,153,552 B2 | 12/2006 | Kubo et al. |
| 7,156,137 B2 | 1/2007 | Corvasce et al. |
| 7,163,975 B2 | 1/2007 | Zanzig et al. |
| 7,166,339 B1 | 1/2007 | Mori et al. |
| 7,166,665 B2 | 1/2007 | Galimberti et al. |
| 7,182,981 B1 | 2/2007 | Tachibana et al. |
| 7,184,112 B2 | 2/2007 | Kuzuhara et al. |
| 7,208,205 B2 | 4/2007 | Shibue et al. |
| 7,208,592 B2 | 4/2007 | Kawanishi et al. |
| 7,220,460 B2 | 5/2007 | Murakami et al. |
| 7,226,499 B2 | 6/2007 | Matsufuji et al. |
| 7,247,663 B2 | 7/2007 | Kikuchi et al. |
| 7,249,621 B2 | 7/2007 | Sandstrom |
| 7,250,201 B2 | 7/2007 | Yamazaki et al. |
| 7,252,864 B2 | 8/2007 | Nair et al. |
| 7,252,865 B2 | 8/2007 | Schunk et al. |
| 7,253,221 B2 | 8/2007 | Mohanty et al. |
| 7,273,894 B2 | 9/2007 | Shelby et al. |
| 7,276,546 B2 | 10/2007 | Buchanan et al. |
| 7,282,091 B2 | 10/2007 | Hashimoto |
| 7,306,832 B2 | 12/2007 | Tasaka et al. |
| 7,314,894 B2 | 1/2008 | Horiguchi |
| 7,323,530 B2 | 1/2008 | Okubo et al. |
| 7,347,947 B2 | 3/2008 | Nakamura et al. |
| 7,354,633 B2 | 4/2008 | Saito et al. |
| 7,378,468 B2 | 5/2008 | Lechtenboehmer |
| 7,393,579 B2 | 7/2008 | Bermel |
| 7,404,424 B2 | 7/2008 | Higuchi |
| 7,445,821 B2 | 11/2008 | Michihata |
| 7,459,212 B2 | 12/2008 | Yamakawa et al. |
| 7,462,306 B2 | 12/2008 | Fukagawa |
| 7,462,382 B2 | 12/2008 | Ito et al. |
| 7,466,377 B2 | 12/2008 | Umeda et al. |
| 7,468,153 B2 | 12/2008 | Weydert et al. |
| 7,470,385 B2 | 12/2008 | Yamada |
| 7,471,360 B2 | 12/2008 | Murakami et al. |
| 7,479,312 B2 | 1/2009 | Tamagawa et al. |
| 7,501,167 B2 | 3/2009 | Sugiyama |
| 7,504,139 B2 | 3/2009 | Kawanishi et al. |
| 7,528,181 B2 | 5/2009 | Bailey |
| 7,550,182 B2 | 6/2009 | Inagaki et al. |
| 7,559,986 B2 | 7/2009 | Takeuchi et al. |
| 7,569,259 B2 | 8/2009 | Okubo et al. |
| 7,569,261 B2 | 8/2009 | Sasada |
| 7,585,905 B2 | 9/2009 | Shelton et al. |
| 7,599,028 B2 | 10/2009 | Kuzuhara et al. |
| 7,604,852 B2 | 10/2009 | Oya |
| 7,611,760 B2 | 11/2009 | Hayashi et al. |
| 7,615,264 B2 | 11/2009 | Fukagawa et al. |
| 7,625,970 B2 | 12/2009 | Klinkenberg et al. |
| 7,635,506 B2 | 12/2009 | Takagi |
| 7,651,743 B2 | 1/2010 | Fukagawa et al. |
| 7,659,331 B2 | 2/2010 | Gibson et al. |
| 7,662,801 B2 | 2/2010 | Kumar et al. |
| 7,666,482 B2 | 2/2010 | Umeda et al. |
| 7,695,780 B2 | 4/2010 | Ohgaru et al. |
| 7,704,570 B2 | 4/2010 | Takebe et al. |
| 7,709,067 B2 | 5/2010 | Takagi et al. |
| 7,709,572 B2 | 5/2010 | Takebe et al. |
| 7,732,523 B2 | 6/2010 | Morimoto et al. |
| 7,799,873 B2 | 9/2010 | Soeda |
| 7,868,073 B2 | 1/2011 | Kameda |
| 7,897,662 B2 | 3/2011 | Jozef Klinkenberg et al. |
| 7,947,141 B2 | 5/2011 | Kameda |
| 8,003,725 B2 | 8/2011 | Chapman et al. |
| 8,021,730 B2 | 9/2011 | Tsou et al. |
| 8,022,136 B2 | 9/2011 | Yano et al. |
| 8,067,488 B2 | 11/2011 | Buchanan et al. |
| 8,092,627 B2 | 1/2012 | Hashimura et al. |
| 8,188,164 B2 | 5/2012 | Chen et al. |
| 8,201,603 B2 | 6/2012 | Matsuda et al. |
| 8,372,193 B2 | 2/2013 | Chen et al. |
| 8,444,757 B2 | 5/2013 | Yamada et al. |
| 8,552,105 B2 | 10/2013 | Peters |
| 8,597,421 B2 | 12/2013 | Harada et al. |
| 8,668,771 B2 | 3/2014 | Harada et al. |
| 8,851,084 B2 | 10/2014 | Lemmouchi et al. |
| 8,922,889 B2 | 12/2014 | Fukagawa et al. |
| 9,068,063 B2 | 6/2015 | Helmer et al. |
| 2002/0028857 A1 | 3/2002 | Holy |
| 2002/0086163 A1 | 7/2002 | Shimizu et al. |
| 2002/0132960 A1 | 9/2002 | Haile et al. |
| 2002/0156270 A1 | 10/2002 | Kazama et al. |
| 2002/0192397 A1 | 12/2002 | Tsujimoto |
| 2003/0092801 A1 | 5/2003 | Agostini et al. |
| 2004/0024093 A1 | 2/2004 | Weydert et al. |
| 2004/0116587 A1* | 6/2004 | Victor Thielen et al. .... 524/493 |
| 2004/0174474 A1 | 9/2004 | Tachibana et al. |
| 2004/0180993 A1 | 9/2004 | Shelton et al. |
| 2004/0181009 A1 | 9/2004 | Shelton et al. |
| 2004/0182486 A1 | 9/2004 | Bernard et al. |
| 2005/0056356 A1 | 3/2005 | Lechtenbohmer et al. |
| 2005/0192434 A1 | 9/2005 | Buchanan et al. |
| 2005/0234231 A1 | 10/2005 | Hashimoto et al. |
| 2006/0004192 A1 | 1/2006 | Oya et al. |
| 2006/0058425 A1 | 3/2006 | Mohanty et al. |
| 2006/0068128 A1 | 3/2006 | Greener et al. |
| 2006/0069192 A1 | 3/2006 | Nakamura et al. |
| 2006/0106149 A1 | 5/2006 | Sandstrom et al. |
| 2006/0106164 A1 | 5/2006 | Suzuki |

(56) References Cited

U.S. PATENT DOCUMENTS

| | | |
|---|---|---|
| 2006/0142559 A1 | 6/2006 | Ozaki et al. |
| 2006/0188667 A1 | 8/2006 | Watanabe et al. |
| 2006/0222786 A1 | 10/2006 | Oya et al. |
| 2006/0286397 A1 | 12/2006 | McCreight et al. |
| 2007/0046872 A1 | 3/2007 | Tasaka |
| 2007/0048461 A1 | 3/2007 | Nakajima et al. |
| 2007/0048462 A1 | 3/2007 | Takebe et al. |
| 2007/0092663 A1 | 4/2007 | Murakami |
| 2007/0178252 A1 | 8/2007 | Tasaka et al. |
| 2007/0209744 A1 | 9/2007 | Matsumura |
| 2007/0211336 A1 | 9/2007 | Michihata |
| 2007/0241480 A1 | 10/2007 | Kanenari et al. |
| 2007/0247576 A1 | 10/2007 | Tamagawa et al. |
| 2007/0264446 A1 | 11/2007 | Otoshi et al. |
| 2007/0298194 A1 | 12/2007 | Fukagawa et al. |
| 2008/0032067 A1 | 2/2008 | Sakurazawa et al. |
| 2008/0085953 A1 | 4/2008 | Bhattacharya et al. |
| 2008/0093012 A1 | 4/2008 | Hashimura |
| 2008/0105213 A1 | 5/2008 | Chen |
| 2008/0122128 A1 | 5/2008 | Irie et al. |
| 2008/0139803 A1 | 6/2008 | Sasada |
| 2008/0173215 A1 | 7/2008 | Sakurazawa et al. |
| 2008/0182924 A1 | 7/2008 | Morimoto et al. |
| 2008/0213512 A1 | 9/2008 | Nakamura et al. |
| 2008/0214699 A1 | 9/2008 | Halahmi et al. |
| 2008/0226930 A1 | 9/2008 | Furuichi et al. |
| 2008/0261722 A1 | 10/2008 | Bulpett et al. |
| 2008/0280072 A1 | 11/2008 | Arai et al. |
| 2008/0314491 A1 | 12/2008 | Soeda et al. |
| 2008/0314492 A1 | 12/2008 | Tsou et al. |
| 2009/0038728 A1 | 2/2009 | Kanenari |
| 2009/0043088 A1 | 2/2009 | Shimamoto et al. |
| 2009/0050842 A1 | 2/2009 | Shelby et al. |
| 2009/0053496 A1 | 2/2009 | Arita et al. |
| 2009/0054638 A1 | 2/2009 | Shelby et al. |
| 2009/0057610 A1 | 3/2009 | Godfrey |
| 2009/0062413 A1 | 3/2009 | Adur et al. |
| 2009/0062431 A1 | 3/2009 | Nasr et al. |
| 2009/0068377 A1 | 3/2009 | Kuki |
| 2009/0074989 A1 | 3/2009 | Nakamura et al. |
| 2009/0082492 A1 | 3/2009 | Klinkenberg et al. |
| 2009/0082511 A1 | 3/2009 | Klinkenberg et al. |
| 2009/0084550 A1 | 4/2009 | Korte et al. |
| 2009/0092771 A1 | 4/2009 | Sasata et al. |
| 2009/0096962 A1 | 4/2009 | Shelton et al. |
| 2009/0114329 A1 | 5/2009 | Tomoi |
| 2009/0142515 A1 | 6/2009 | Nakamura et al. |
| 2009/0143502 A1 | 6/2009 | Obie |
| 2009/0151841 A1 | 6/2009 | Jones et al. |
| 2009/0169772 A1 | 7/2009 | Yamada et al. |
| 2009/0169775 A1 | 7/2009 | Mukunoki et al. |
| 2009/0174845 A1 | 7/2009 | Takagi |
| 2009/0181232 A1 | 7/2009 | Wang et al. |
| 2009/0185112 A1 | 7/2009 | Kawabe et al. |
| 2009/0203898 A1 | 8/2009 | Buchanan et al. |
| 2009/0203899 A1 | 8/2009 | Buchanan et al. |
| 2009/0203900 A1 | 8/2009 | Buchanan et al. |
| 2009/0207491 A1 | 8/2009 | Takebe et al. |
| 2009/0211683 A1 | 8/2009 | Takahashi |
| 2009/0218024 A1 | 9/2009 | Tsou et al. |
| 2009/0227782 A1 | 9/2009 | Fujita et al. |
| 2009/0230576 A1 | 9/2009 | Nagashima |
| 2009/0246416 A1 | 10/2009 | Kawabe et al. |
| 2009/0246674 A1 | 10/2009 | Carlini et al. |
| 2009/0247682 A1 | 10/2009 | Galimberti et al. |
| 2009/0251643 A1 | 10/2009 | Yamada et al. |
| 2009/0253871 A1 | 10/2009 | Flynn et al. |
| 2009/0283194 A1 | 11/2009 | Hashimoto et al. |
| 2009/0286095 A1 | 11/2009 | Shelton et al. |
| 2009/0306361 A1 | 12/2009 | Kawabe et al. |
| 2009/0317567 A1 | 12/2009 | Takeda et al. |
| 2010/0002297 A1 | 1/2010 | Shibuya |
| 2010/0018622 A1 | 1/2010 | Tanno et al. |
| 2010/0024941 A1 | 2/2010 | Hara et al. |
| 2010/0040806 A1 | 2/2010 | Suzuki et al. |
| 2010/0040854 A1 | 2/2010 | Takada et al. |
| 2010/0040889 A1 | 2/2010 | Harano et al. |
| 2010/0043937 A1 | 2/2010 | Matsunaga et al. |
| 2010/0047480 A1 | 2/2010 | Suzuki et al. |
| 2010/0050889 A1 | 3/2010 | Manzini et al. |
| 2010/0069535 A1 | 3/2010 | Suzuki et al. |
| 2010/0071823 A1 | 3/2010 | Tomoi |
| 2010/0079707 A1 | 4/2010 | Nakayama et al. |
| 2010/0089288 A1 | 4/2010 | Shelby et al. |
| 2010/0105830 A1 | 4/2010 | Kaneko |
| 2010/0108212 A1 | 5/2010 | Kameda et al. |
| 2010/0108221 A1 | 5/2010 | Shibata et al. |
| 2010/0147440 A1 | 6/2010 | Matsunaga |
| 2010/0154960 A1 | 6/2010 | Kishizoe |
| 2010/0178309 A1 | 7/2010 | Matsui et al. |
| 2010/0181003 A1 | 7/2010 | Inoue |
| 2010/0184885 A1 | 7/2010 | Kawamura et al. |
| 2010/0236695 A1 | 9/2010 | Lamontia et al. |
| 2010/0288410 A1 | 11/2010 | Mori |
| 2010/0317800 A1 | 12/2010 | Pille-Wolf et al. |
| 2010/0319829 A1 | 12/2010 | Hashimura et al. |
| 2011/0030868 A1 | 2/2011 | Hamanaka |
| 2011/0039976 A1 | 2/2011 | Vasseur |
| 2011/0039986 A1 | 2/2011 | Takada et al. |
| 2011/0041975 A1 | 2/2011 | Iizuka |
| 2011/0046272 A1 | 2/2011 | Smits et al. |
| 2011/0056603 A1 | 3/2011 | Koutoku et al. |
| 2011/0136939 A1 | 6/2011 | Lechtenboehmer et al. |
| 2011/0160354 A1 | 6/2011 | Kouno et al. |
| 2011/0198011 A1 | 8/2011 | Matsuda et al. |
| 2011/0319529 A1 | 12/2011 | Helmer et al. |
| 2011/0319530 A1 | 12/2011 | Helmer et al. |
| 2014/0272368 A1 | 9/2014 | Herod |

FOREIGN PATENT DOCUMENTS

| | | |
|---|---|---|
| EP | 0722980 A1 | 7/1996 |
| EP | 0995775 A1 | 4/2000 |
| EP | 1086830 B1 | 11/2004 |
| EP | 1514900 B1 | 12/2007 |
| EP | 1950053 A1 | 7/2008 |
| EP | 2039532 A1 | 3/2009 |
| EP | 2072574 A1 | 6/2009 |
| EP | 2333008 A1 | 6/2011 |
| JP | 62-032137 | 2/1987 |
| JP | 63-189476 | 8/1988 |
| JP | H082597413217239 A | 10/1996 |
| JP | 2004131670 A | 4/2004 |
| JP | 2005053944 A | 3/2005 |
| JP | 2006111858 A | 4/2006 |
| JP | 2007-161943 A | 6/2007 |
| JP | 2007224253 A | 9/2007 |
| JP | 2009096917 A | 5/2009 |
| JP | 2009263417 A | 11/2009 |
| RU | 2 050 390 | 12/1995 |
| WO | WO 00/34383 A1 | 6/2000 |
| WO | WO 2005/108480 A1 | 11/2005 |
| WO | WO 2005/111184 A2 | 11/2005 |
| WO | WO 2005108480 A1 * | 11/2005 |
| WO | WO 2009/029217 A1 | 3/2009 |
| WO | WO 2009/063694 | 5/2009 |
| WO | WO 2010/032551 A1 | 3/2010 |

OTHER PUBLICATIONS

Gedon, Steven, et al.; "Cellulose Esters, Inorganic Esters," Kirk-Othmer Encyclopedia of Chemical Technology, 5th Edition, 2004, vol. 5, pp. 394-444.

Ghiya, et al., "Biodegradability of Cellulose Acetate Plasticized with Citrate Esters," Journal of Macromolecular Science, Part A, vol. 33, Issue 5, May 1996, pp. 627-638.

Angellier, H. et al., "Processing and Structural Properties of Waxy Maize Starch Nanocrystals Reinforced Natural Rubber," Macromolecules, 2005, pp. 3783-3792, vol. 38, American Chemical Society.

Angellier, H. et al., "Mechanical Properties of Waxy Maize Starch Nanocrystal Reinforced Natural Rubber," Macromolecules, 2005, pp. 9161-9170, vol. 38, American Chemical Society.

(56) References Cited

OTHER PUBLICATIONS

Angellier, H. et al., "Optimization of the Preparation of Aqueous Suspensions of Waxy Maize Starch Nanocrystals Using a Response Surface Methodology," Biomacromolecules, 2004, pp. 1545-1551, vol. 5, American Chemical Society.
Putaux, J. et al., "Platelet Nanocrystals Resulting from the Disruption of Waxy Maize Starch Granules by Acid Hydrolysis," Biomacromolecules, 2003, pp. 1198-1202, vol. 4, American Chemical Society.
Basu, S., "Cellulose Esters in Rubber II: Preparation of Sub-Micron Cellulose Ester Particles for Application as Fillers in Tire Treads," Eastman Chemical Company Technical Report 2009-07319, 2009.
Wu, Y. et al., "A Strategy to Prepare High Performance Starch/rubber Composites: In Situ Modification During Latex Compounding Process," Carbohydrate Polymers, 2006, pp. 109-113, vol. 65, Elsevier Ltd.
Bai, W. et al., "Partial Replacement of Silica with Microcrystalline Cellulose in Rubber Composites," Composites: Part A, 2009, pp. 1597-1605, vol. 40, Elsevier Ltd.
Critical Surface Tension Parameters for Various Polymers. Accudynetests website. Dated 2009. Downloaded Nov. 28, 2012.
Nie, L., et al., "Grafting Cellulose Acetate with Styrene Maleic Anydride Random Copolymers for Improved Dimensional Stability of Cellulose Acetate", J. Applied Polymer Sci., 2003, 54, 601-617.
"Eastman Cellulose-based specialty polymers", Bulletin E-325G 6/09. [Downloaded from internet on Jan. 16, 2013. Website: http://web.archive.org/web/20110516033534/http://www.eastman.com/Literature_Center/E/E325.pdf] May 16, 2001 (May 16, 2001) p. 8, Table 1.
Bai, W. "New Application of Crystalline Cellulose in Rubber Composites", Nov. 3, 2009, A Dissertation submitted to Oregon State University, pp. 1-204, entire document. (Abstract).
Copending U.S. Appl. No. 13/170,595, filed Jun. 28, 2011, Bradley James Helmer et al.
Copending U.S. Appl. No. 13/170,606, filed Jun. 28, 2011, Bradley James Helmer et al.
Copending U.S. Appl. No. 13/170,609, filed Jun. 28, 2011, Bradley James Helmer et al.
Copending U.S. Appl. No. 13/170,611, filed Jun. 28, 2011, Bradley James Helmer et al.
Copending U.S. Appl. No. 13/690,953, filed Nov. 30, 2012, Basu et al.
USPTO Office Action mailed Dec. 6, 2012 for U.S. Appl. No. 13/170,609.
Copending U.S. Appl. No. 13/690,909, filed Nov. 30, 2012.
Copending U.S. Appl. No. 13/690,945, filed Nov. 30, 2012.
Copending U.S. Appl. No. 13/690,968, filed Nov. 30, 2012.
Copending U.S. Appl. No. 13/691,007, filed Nov. 30, 2012.
Copending U.S. Appl. No. 13/690,930, filed Nov. 30, 2012.
Copending U.S. Appl. No. 13/690,937, filed Nov. 30, 2012.
Copending U.S. Appl. No. 13/690,890, filed Nov. 30, 2012.
Copending U.S. Appl. No. 13/690,919, filed Nov. 30, 2012.
Copending U.S. Appl. No. 13/690,944, filed Nov. 30, 2012.
Copending U.S. Appl. No. 13/690,958, filed Nov. 30, 2012.
Copending U.S. Appl. No. 13/690,981, filed Nov. 30, 2012.
USPTO Office Action received in U.S. Appl. No. 13/170,609 on Jul. 2, 2013.
USPTO Office Action received in U.S. Appl. No. 13/170,606 on Aug. 21, 2013.
USPTO Office Action received in U.S. Appl. No. 13/690,953 dated Oct. 11, 2013.
Notification of Transmittal of The International Search Report and The Written Opinion of the International Searching Authority, or the Declaration, International Application No. PCT/US 11/42266 with a filing date of Jun. 29, 2011.
Notification of Transmittal of The International Search Report and The Written Opinion of the International Searching Authority, or the Declaration, International Application No. PCT/US2012/068086 with a filing date of Feb. 28, 2013.
Notification of Transmittal of The International Search Report and The Written Opinion of the International Searching Authority, or the Declaration, International Application No. PCT/US 12/68131 with a mailing date of Feb. 5, 2013.
Notification of Transmittal of The International Search Report and The Written Opinion of the International Searching Authority, or the Declaration, International Application No. PCT/US 12/68096 with a mailing date of Feb. 15, 2013.
Notification of Transmittal of The International Search Report and The Written Opinion of the International Searching Authority, or the Declaration, International Application No. PCT/US 12/68124 with a mailing date of Feb. 19, 2013.
Notification of Transmittal of The International Search Report and The Written Opinion of the International Searching Authority, or the Declaration, International Application No. PCT/US 12/68114 with a mailing date of Feb. 25, 2013.
Notification of Transmittal of The International Search Report and The Written Opinion of the International Searching Authority, or the Declaration, International Application No. PCT/US 12/68140 with a mailing date of Feb. 15, 2013.
Notification of Transmittal of The International Search Report and The Written Opinion of the International Searching Authority, or the Declaration, International Application No. PCT/US 12/68109 with a mailing date of Feb. 15, 2013.
Notification of Transmittal of The International Search Report and The Written Opinion of the International Searching Authority, or the Declaration, International Application No. PCT/US 12/68147 with a mailing date of Feb. 19, 2013.
Notification of Transmittal of The International Search Report and The Written Opinion of the International Searching Authority, or the Declaration, International Application No. PCT/US2012/068088 with a mailing date of Feb. 22, 2013.
Notification of Transmittal of The International Search Report and The Written Opinion of the International Searching Authority, or the Declaration, International Application No. PCT/US 12/68097with a mailing date of Feb. 15, 2013.
Notification of Transmittal of The International Search Report and The Written Opinion of the International Searching Authority, or the Declaration, International Application No. PCT/US2012/068093 with a mailing date of Feb. 19, 2013.
Notification of Transmittal of The International Search Report and The Written Opinion of the International Searching Authority, or the Declaration, International Application No. PCT/US 12/68100 with a mailing date of Feb. 19, 2013.
Notification of Transmittal of The International Search Report and The Written Opinion of the International Searching Authority, or the Declaration, International Application No. PCT/US 12/68102 with a mailing date of Feb. 19, 2013.
European Search Report dated Dec. 11, 2013 with an application No. 11804164.9-1306/2588518 PCT/US2011042266.
USPTO Office Action dated Feb. 6, 2014 for copending U.S. Appl. No. 13/170,606.
USPTO Office Action dated Feb. 13, 2014 for copending U.S. Appl. No. 13/170,609.
Anneken, David J., et al.; "Fatty Acids"; Ullmann's Encyclopedia of Industrial Chemistry, vol. 14, pp. 73-116, Published online Dec. 15, 2006.
USPTO Office Action dated Apr. 18, 2014 for copending U.S. Appl. No. 13/690,593.
USPTO Office Action dated Apr. 23, 2014 for copending U.S. Appl. No. 13/690,919.
USPTO Office Action dated Apr. 29, 2014 for copending U.S. Appl. No. 13/690,944.
USPTO Office Action dated Apr. 29, 2014 for copending U.S. Appl. No. 13/690,981.
USPTO Office Action dated May 7, 2014 for copending U.S. Appl. No. 13/690,937.
Reinecke Helmut, et al.; "Plasticizers"; Encyclopedia of Polymer Science and Technology; Copyright 2011, pp. 1-27.
USPTO Office Action dated May 15, 2014 for copending U.S. Appl. No. 13/690,945.
USPTO Office Action dated May 15, 2014 for copending U.S. Appl. No. 13/690,958.

(56) References Cited

OTHER PUBLICATIONS

USPTO Office Action dated Jun. 2, 2014 for copending U.S. Appl. No. 13/690,890.
USPTO Office Action dated Jun. 2, 2014 for copending U.S. Appl. No. 13/690,909.
USPTO Office Action dated Jun. 6, 2014 for copending U.S. Appl. No. 13/170,611.
USPTO Office Action dated Jul. 1, 2014 for copending U.S. Appl. No. 13/170,595.
USPTO Office Action dated Jul. 2, 2014 for copending U.S. Appl. No. 13/690,968.
Eastman Cellulose Acetate Butyrate (CAB-381-0.1); Product Data Sheet; http://ws.eastman.com/ProductCatalogApps/PageControllers/ProdDatasheet_PC.aspx?Product=71001226; Obtained on Jun. 10, 2014.
USPTO Office Action dated Jul. 7, 2014 for copending U.S. Appl. No. 13/690,930.
USPTO Office Action dated Jul. 17, 2014 for copending U.S. Appl. No. 13/691,007.
USPTO Office Action dated Oct. 2, 2014 for copending U.S. Appl. No. 13/170,609.
USPTO Office Action dated Oct. 14, 2014 for copending U.S. Appl. No. 13/690,945.
USPTO Office Action dated Oct. 14, 2014 for copending U.S. Appl. No. 13/690,958.
USPTO Office Action dated Dec. 10, 2014 for copending U.S. Appl. No. 13/690,944.
USPTO Office Action dated Dec. 26, 2014 for copending U.S. Appl. No. 13/690,968.
USPTO Office Action dated Dec. 26, 2014 for copending U.S. Appl. No. 13/691,007.
USPTO Office Action dated Dec. 11, 2014 for copending U.S. Appl. No. 13/690,981.
USPTO Office Action dated Feb. 4, 2015 for co-pending U.S. Appl. No. 13/690,945.
USPTO Office Action dated Feb. 4, 2015 for co-pending U.S. Appl. No. 13/690,958.
USPTO Office Action dated Feb. 24, 2015 for co-pending U.S. Appl. No. 13/170,595.
USPTO Notice of Allowance dated Mar. 25, 2015 for co-pending U.S. Appl. No. 13/170,609.
USPTO Office Action dated Jul. 28, 2015 for co-pending U.S. Appl. No. 13/690,944.
USPTO Office Action dated Jul. 28, 2015 for co-pending U.S. Appl. No. 13/690,909.
USPTO Office Action dated Jul. 29, 2015 for co-pending U.S. Appl. No. 13/690,981.
USPTO Office Action dated Aug. 6, 2015 for co-pending U.S. Appl. No. 13/170,611.
USPTO Office Action dated Aug. 11, 2015 for co-pending U.S. Appl. No. 13/690,945.
USPTO Office Action dated Aug. 11, 2015 for co-pending U.S. Appl. No. 13/690,968.
USPTO Office Action dated Aug. 19, 2015 for co-pending U.S. Appl. No. 13/691,007.
Extended European Search Report dated Aug. 3, 2015 with an application No. 12855885.5-1306/2788420 PCT US/2012068096.
Extended European Search Report dated Aug. 3, 2015 with an application No. 12868425.5-1306/2788422 PCT/US2012068093.
Extended European Search Report dated Aug. 3, 2015 with an application No. 12856382.2-1306/2788421 PCT/US2012068086.
USPTO Office Action dated Sep. 17, 2015 for co-pending U.S. Appl. No. 13/170,595.
Kraemer, Elmer O.; "Molecular Weights of Celluloses"; Industrial and Engineering Chemistry, col. 30, No. 10, pp. 1200-1203, Oct. 1938.
Wohlfarth, CH.; "Vapor-liquid equilibrium data of cellulose acetate in pyridine"; Landolt-Bornstein—Group VIII Advanced Materials and Technologies 6D1 (polymer solutions) (2009).
USPTO Office Action dated Oct. 1, 2015 for co-pending U.S. Appl. No. 13/690,958.
USPTO Notice of Allowance dated Oct. 2, 2015 for co-pending U.S. Appl. No. 13/170,606.
USPTO Office Action dated Jan. 7, 2016 for co-pending U.S. Appl. No. 13/690,945.
USPTO Office Action dated Jan. 15, 2016 for co-pending U.S. Appl. No. 13/690,909.
USPTO Office Action dated Feb. 4, 2016 for co-pending U.S. Appl. No. 13/690,968.
USPTO Office Action dated Mar. 9, 2016 for co-pending U.S. Appl. No. 13/690,944.
USPTO Office Action dated Mar. 9, 2016 for co-pending U.S. Appl. No. 13/690,981.
USPTO Office Action dated Mar. 17, 2016 for co-pending U.S. Appl. No. 13/691,007.
USPTO Office Action dated Apr. 14, 2016 for co-pending U.S. Appl. No. 13/690,958.
USPTO Office Action dated Sep. 8, 2016 for co-pending U.S. Appl. No. 13/690,945.
USPTO Office Action dated Sep. 13, 2016 for co-pending U.S. Appl. No. 13/690,958.
USPTO Office Action dated Oct. 14, 2016 for co-pending U.S. Appl. No. 13/690,944.
USPTO Office Action dated Nov. 7, 2016 for co-pending U.S. Appl. No. 13/690,909.
USPTO Office Action dated Dec. 6, 2016 for co-pending U.S. Appl. No. 13/690,968.
USPTO Office Action dated Dec. 21, 2016 for co-pending U.S. Appl. No. 13/690,981.
USPTO Office Action dated Jan. 5, 2017 for co-pending U.S. Appl. No. 13/691,007.

\* cited by examiner

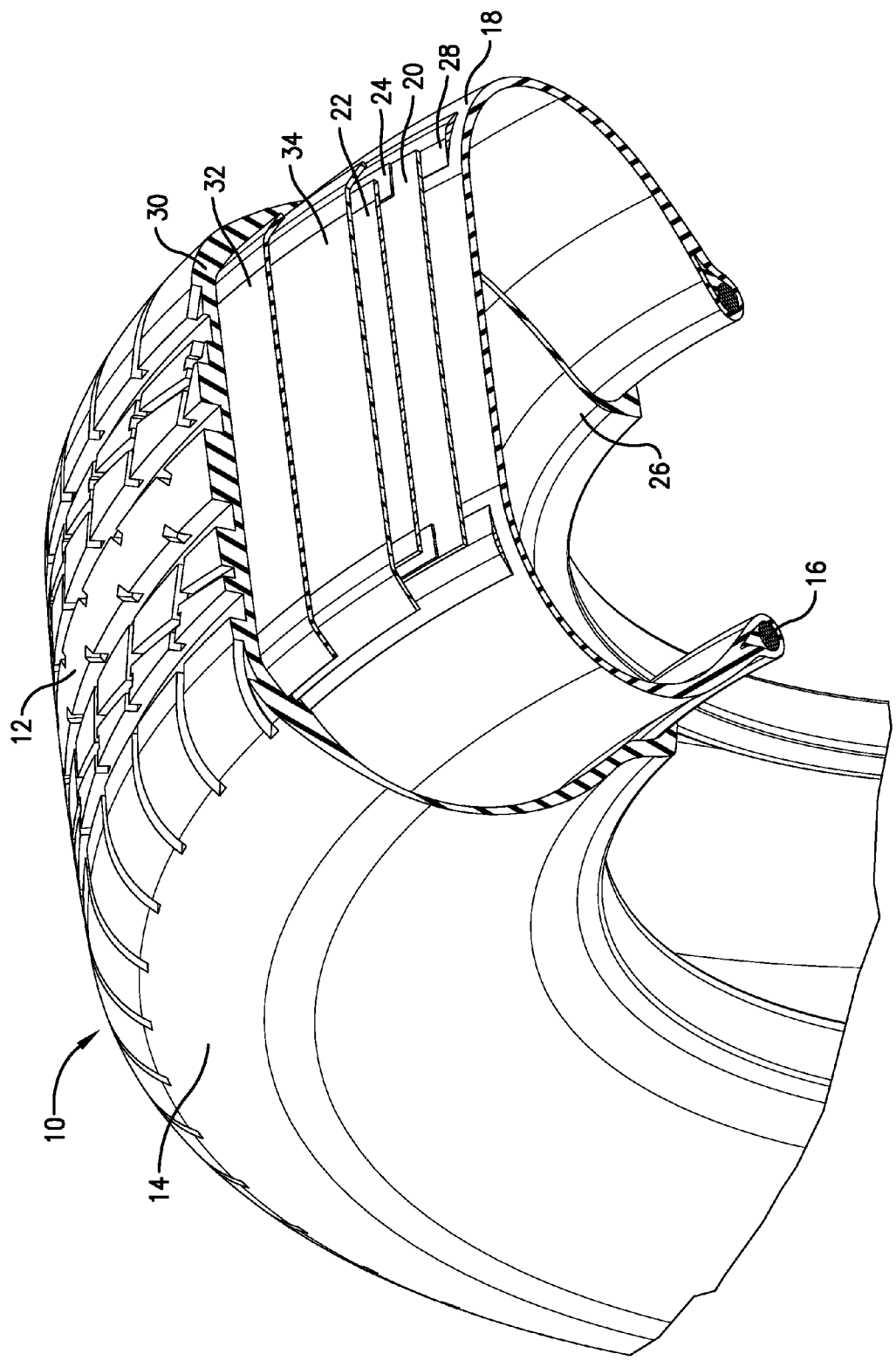

CELLULOSE ESTERS IN PNEUMATIC TIRES

RELATED APPLICATIONS

This application claims priority to U.S. Provisional Application Ser. Nos. 61/567,948; 61/567,950; 61/567,951; and 61/567,953 filed on Dec. 7, 2011, the disclosures of which are incorporated herein by reference to the extent they do not contradict the statements herein.

FIELD OF THE INVENTION

The present invention relates generally to elastomeric compositions comprising a cellulose ester and to processes for making such elastomeric compositions.

BACKGROUND OF THE INVENTION

Elastomeric compositions comprising high amounts of filler are commonly used to produce tires or various tire components due to their increased elasticity, hardness, tear resistance, and stiffness. These enhanced properties of the elastomeric composition are generally achieved by adding large amounts of fillers (e.g., carbon black, silica, and other minerals) to the composition during production. An additional benefit of highly-filled elastomeric compositions is that they can be produced on a more economic scale compared to elastomeric compositions containing little or no fillers, thereby decreasing the overall production costs of tires incorporating such compositions. The elastomers are generally the most expensive component in an elastomeric composition, thus the utilization of high amounts of filler can minimize the amount of expensive elastomer needed.

Unfortunately, the presence of high amounts of fillers in an elastomeric composition greatly increases the processing viscosity of the composition, thus making it very difficult to process. One current solution to this problem is to add a processing aid, such as an aromatic processing oil, to the elastomeric composition in order to reduce its processing viscosity. However, the incorporation of such processing aids into the elastomeric compositions often softens the cured elastomeric compositions, thereby mitigating the benefits of adding high amounts of filler to the composition. Thus, due to these processing restrictions, many conventional highly-filled elastomeric compositions may have limited application in tires and tire components.

Accordingly, there is a need for a highly-filled elastomeric composition that is both easily processable and that exhibits ideal elasticity, hardness, tear resistance, and stiffness when used in tires and tire components. In addition, there is a need for a processing aid for elastomeric compositions that can improve the processability of the elastomeric composition and also enhance its elasticity, hardness, tear resistance, and/or stiffness when used in tires.

BRIEF SUMMARY OF THE INVENTION

In one embodiment of the present invention, a tire component is provided. The tire component comprises an elastomeric composition containing at least one non-fibril cellulose ester, at least one non-nitrile primary elastomer, optionally a starch, and at least about 70 parts per hundred rubber (phr) of one or more fillers. The ratio of cellulose ester to starch in the composition is at least about 3:1. Further, the cellulose ester is in the form of particles having an average diameter of less than about 10 μm.

In another embodiment of the present invention, a tire component is provided. The tire component comprises an elastomeric composition containing at least one non-fibril cellulose ester, at least one primary elastomer, and one or more fillers. The elastomeric composition exhibits a dynamic mechanical analysis (DMA) strain sweep modulus as measured at 5% strain and 30° C. of at least 1,450,000 Pa and a molded groove tear as measured according to ASTM D624 of at least about 120 lbf/in.

In yet another embodiment of the present invention, a process for producing a tire component is provided. The process comprises (a) blending at least one cellulose ester, at least one non-nitrile primary elastomer, and at least 70 phr of one or more fillers at a temperature that exceeds the Tg of the cellulose ester to produce an elastomeric composition having a Mooney viscosity at 100° C. as measured according to ASTM D1646 of not more than about 110 AU; and (b) forming a tire component with the elastomeric composition.

In a further embodiment of the present invention, a process for producing a tire component is provided. The process comprises blending an elastomeric composition containing at least one non-fibril cellulose ester, at least one primary elastomer, and one or more fillers, wherein the elastomeric composition exhibits a dynamic mechanical analysis (DMA) strain sweep modulus as measured at 5% strain and 30° C. of at least 1,450,000 Pa and a molded groove tear as measured according to ASTM D624 of at least 120 lbf/in.

Other inventions concerning the use of cellulose esters in elastomers have been filed in original applications by Eastman Chemical Company on Nov. 30, 2012 entitled "Cellulose Esters in Highly Filled Elastomeric Systems", "Cellulose Ester Elastomer Compositions", and "Process for Dispersing Cellulose Esters into Elastomeric Compositions"; the disclosures of which are hereby incorporated by reference to the extent that they do not contradict the statements herein.

BRIEF SUMMARY OF THE FIGURES

FIG. 1 is a sectional view of a pneumatic tire produced according to one embodiment of the present invention.

DETAILED DESCRIPTION

This invention relates generally to the dispersion of cellulose esters into elastomeric compositions in order to improve the mechanical and physical properties of the elastomeric composition. It has been observed that cellulose esters can provide a dual functionality when utilized in elastomeric compositions and their production. For instance, cellulose esters can act as a processing aid since they can melt and flow at elastomer processing temperatures, thereby breaking down into smaller particles and reducing the viscosity of the composition during processing. After being dispersed throughout the elastomeric composition, the cellulose esters can re-solidify upon cooling and can act as a reinforcing filler that strengthens the elastomeric composition and, ultimately, any tire or tire component incorporating such elastomeric composition.

In certain embodiments of this invention, a tire and/or tire component is provided that is produced from a highly-filled elastomeric composition comprising high amounts of one or more fillers. Highly-filled elastomeric compositions are desirable for use in tires due to their increased modulus, strength, and elasticity. Unfortunately, it has been observed that adding high amounts of filler to an elastomeric composition makes subsequent processing of the elastomeric composition very difficult due to the increased viscosity of the composition. However, the addition of cellulose esters to the elastomeric composition can remedy many of the deficiencies exhibited by conventional highly-filled elastomeric compositions. Thus, in certain embodiments of the present invention, cellulose esters can enable the production of highly-filled elastomeric compositions that exhibit superior viscosity during processing and enhanced modulus, stiffness, hardness, and tear properties during use in tires.

In certain embodiments of this invention, an elastomeric composition is provided that comprises at least one cellulose ester, at least one primary elastomer, optionally, one or more fillers, and, optionally, one or more additives.

(A) Cellulose Esters

The elastomeric composition of the present invention can comprise at least about 1, 2, 3, 4, 5, or 10 parts per hundred rubber ("phr") of at least one cellulose ester, based on the total weight of the elastomers. Additionally or alternatively, the elastomeric composition of the present invention can comprise not more than about 75, 50, 40, 30, or 20 phr of at least one cellulose ester, based on the total weight of the elastomers. The term "phr," as used herein, refers to parts of a respective material per 100 parts by weight of rubber or elastomer.

The cellulose ester utilized in this invention can be any that is known in the art. The cellulose esters useful in the present invention can be prepared using techniques known in the art or can be commercially obtained, e.g., from Eastman Chemical Company, Kingsport, Tenn., U.S.A.

The cellulose esters of the present invention generally comprise repeating units of the structure:

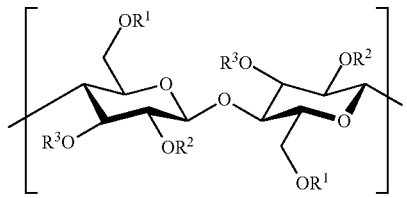

wherein $R^1$, $R^2$, and $R^3$ may be selected independently from the group consisting of hydrogen or a straight chain alkanoyl having from 2 to 10 carbon atoms. For cellulose esters, the substitution level is usually expressed in terms of degree of substitution ("DS"), which is the average number of substitutents per anhydroglucose unit ("AGU"). Generally, conventional cellulose contains three hydroxyl groups per AGU that can be substituted; therefore, the DS can have a value between zero and three. Alternatively, lower molecular weight cellulose mixed esters can have a total degree of substitution ranging from about 3.08 to about 3.5. Generally, cellulose is a large polysaccharide with a degree of polymerization from 700 to 2,000 and a maximum DS of 3.0. However, as the degree of polymerization is lowered, as in low molecular weight cellulose mixed esters, the end groups of the polysaccharide backbone become relatively more significant, thereby resulting in a DS ranging from about 3.08 to about 3.5.

Because DS is a statistical mean value, a value of 1 does not assure that every AGU has a single substituent. In some cases, there can be unsubstituted AGUs, some with two substitutents, and some with three substitutents. The "total DS" is defined as the average number of substitutents per AGU. In one embodiment of the invention, the cellulose esters can have a total DS per AGU (DS/AGU) of at least about 0.5, 0.8, 1.2, 1.5, or 1.7. Additionally or alternatively, the cellulose esters can have a total DS/AGU of not more than about 3.0, 2.9, 2.8, or 2.7. The DS/AGU can also refer to a particular substituent, such as, for example, hydroxyl, acetyl, butyryl, or propionyl. For instance, a cellulose acetate can have a total DS/AGU for acetyl of about 2.0 to about 2.5, while a cellulose acetate propionate ("CAP") and cellulose acetate butyrate ("CAB") can have a total DS/AGU of about 1.7 to about 2.8.

The cellulose ester can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate. These cellulose esters are described in U.S. Pat. Nos. 1,698,049; 1,683,347; 1,880,808; 1,880,560; 1,984,147, 2,129,052; and 3,617,201, which are incorporated herein by reference in their entirety to the extent they do not contradict the statements herein.

In one embodiment of the invention, the cellulose ester is selected from the group consisting of cellulose acetate, cellulose acetate propionate, cellulose acetate butyrate, cellulose triacetate, cellulose tripropionate, cellulose tributyrate, and mixtures thereof.

The degree of polymerization ("DP") as used herein refers to the number of AGUs per molecule of cellulose ester. In one embodiment of the invention, the cellulose esters can have a DP of at least about 2, 10, 50, or 100. Additionally or alternatively, the cellulose esters can have a DP of not more than about 10,000, 8,000, 6,000, or 5,000.

In certain embodiments, the cellulose esters can have an inherent viscosity ("IV") of at least about 0.2, 0.4, 0.6, 0.8, or 1.0 deciliters/gram as measured at a temperature of 25° C. for a 0.25 gram sample in 100 ml of a 60/40 by weight solution of phenol/tetrachloroethane. Additionally or alternatively, the cellulose esters can have an IV of not more than about 3.0, 2.5, 2.0, or 1.5 deciliters/gram as measured at a temperature of 25° C. for a 0.25 gram sample in 100 ml of a 60/40 by weight solution of phenol/tetrachloroethane.

In certain embodiments, the cellulose esters can have a falling ball viscosity of at least about 0.005, 0.01, 0.05, 0.1, 0.5, 1, or 5 pascals-second ("Pa s"). Additionally or alternatively, the cellulose esters can have a falling ball viscosity of not more than about 50, 45, 40, 35, 30, 25, 20, or 10 Pa's.

In certain embodiments, the cellulose esters can have a hydroxyl content of at least about 1.2, 1.4, 1.6, 1.8, or 2.0 weight percent.

In certain embodiments, the cellulose esters useful in the present invention can have a weight average molecular weight ($M_w$) of at least about 5,000, 10,000, 15,000, or 20,000 as measured by gel permeation chromatography ("GPC"). Additionally or alternatively, the cellulose esters useful in the present invention can have a weight average molecular weight ($M_w$) of not more than about 400,000, 300,000, 250,000, 100,000, or 80,000 as measured by GPC. In another embodiment, the cellulose esters useful in the present invention can have a number average molecular weight ($M_n$) of at least about 2,000, 4,000, 6,000, or 8,000 as measured by GPC. Additionally or alternatively, the cellulose esters useful in the present invention can have a number average molecular weight ($M_n$) of not more than about 100,000, 80,000, 60,000, or 40,000 as measured by GPC.

In certain embodiments, the cellulose esters can have a glass transition temperature ("Tg") of at least about 50° C., 55° C., 60° C., 65° C., 70° C., 75° C., or 80° C. Additionally or alternatively, the cellulose esters can have a Tg of not more than about 200° C., 190° C., 180° C., 170° C., 160° C., 150° C., 140° C., or 130° C.

In one embodiment of the present invention, the cellulose esters utilized in the elastomeric compositions have not previously been subjected to fibrillation or any other fiber-producing process. In such an embodiment, the cellulose esters are not in the form of fibrils and can be referred to as "non-fibril."

The cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and from sources such as, for example, cotton linters, softwood pulp, hardwood pulp, corn fiber and other agricultural sources, and bacterial celluloses.

One method of producing cellulose esters is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the cellulose ester. The cellulose ester can be washed with water to remove reaction by-products followed by dewatering and drying.

The cellulose triesters that are hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Inc., Kingsport, Tenn., U.S.A., typically has a DS from about 2.85 to about 2.95.

After esterification of the cellulose to the triester, part of the acyl substitutents can be removed by hydrolysis or by alcoholysis to give a secondary cellulose ester. Secondary cellulose esters can also be prepared directly with no hydrolysis by using a limiting amount of acylating reagent. This process is particularly useful when the reaction is conducted in a solvent that will dissolve cellulose.

In another embodiment of the invention, low molecular weight mixed cellulose esters can be utilized, such as those disclosed in U.S. Pat. No. 7,585,905, which is incorporated herein by reference to the extent it does not contradict the statements herein.

In one embodiment of the invention, a low molecular weight mixed cellulose ester is utilized that has the following properties: (A) a total DS/AGU of from about 3.08 to about 3.50 with the following substitutions: a DS/AGU of hydroxyl of not more than about 0.70, a DS/AGU of C3/C4 esters from about 0.80 to about 1.40, and a DS/AGU of acetyl of from about 1.20 to about 2.34; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In another embodiment of the invention, a low molecular weight mixed cellulose ester is utilized that has the following properties: a total DS/AGU of from about 3.08 to about 3.50 with the following substitutions: a DS/AGU of hydroxyl of not more than about 0.70; a DS/AGU of C3/C4 esters from about 1.40 to about 2.45, and DS/AGU of acetyl of from about 0.20 to about 0.80; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In yet another embodiment of the invention, a low molecular weight mixed cellulose ester is utilized that has the following properties: a total DS/AGU of from about 3.08 to about 3.50 with the following substitutions: a DS/AGU of hydroxyl of not more than about 0.70; a DS/AGU of C3/C4 esters from about 2.11 to about 2.91, and a DS/AGU of acetyl of from about 0.10 to about 0.50; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In certain embodiments, the cellulose esters utilized in this invention can also contain chemical functionality. In such embodiments, the cellulose esters are described herein as "derivatized," "modified," or "functionalized" cellulose esters.

Functionalized cellulose esters are produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride, which links through an ester bond and provides acid functionality; mercaptosilanes, which links through alkoxysilane bonds and provides mercapto functionality; and isocyanotoethyl methacrylate, which links through a urethane bond and gives methacrylate functionality.

In one embodiment of the invention, the functionalized cellulose esters comprise at least one functional group selected from the group consisting of unsaturation (double bonds), carboxylic acids, acetoacetate, acetoacetate imide, mercapto, melamine, and long alkyl chains.

Bifunctional reactants to produce cellulose esters containing unsaturation (double bonds) functionality are described in U.S. Pat. Nos. 4,839,230, 5,741,901, 5,871,573, 5,981, 738, 4,147,603, 4,758,645, and 4,861,629; all of which are incorporated by reference to the extent they do not contradict the statements herein. In one embodiment, the cellulose esters containing unsaturation are produced by reacting a cellulose ester containing residual hydroxyl groups with an acrylic-based compound and m-isopropyenyl-α,α'-dimethylbenzyl isocyanate. The grafted cellulose ester is a urethane-containing product having pendant (meth)acrylate and α-methylstyrene moieties. In another embodiment, the cellulose esters containing unsaturation are produced by reacting maleic anhydride and a cellulose ester in the presence of an alkaline earth metal or ammonium salt of a lower alkyl monocarboxylic acid catalyst, and at least one saturated monocarboxylic acid have 2 to 4 carbon atoms. In another embodiment, the cellulose esters containing unsaturation are produced from the reaction product of (a) at least one cellulosic polymer having isocyanate reactive hydroxyl functionality and (b) at least one hydroxyl reactive poly($\alpha,\beta$ ethyleneically unsaturated) isocyanate.

Bifunctional reactants to produce cellulose esters containing carboxylic acid functionality are described in U.S. Pat. Nos. 5,384,163, 5,723,151, and 4,758,645; all of which are incorporated by reference to the extent they do not contradict the statements herein. In one embodiment, the cellulose esters containing carboxylic acid functionality are produced by reacting a cellulose ester and a mono- or di-ester of maleic or fumaric acid, thereby obtaining a cellulose derivative having double bond functionality. In another embodiment, the cellulose esters containing carboxylic acid functionality has a first and second residue, wherein the first residue is a residue of a cyclic dicarboxylic acid anhydride and the second residue is a residue of an oleophilic monocarboxylic acid and/or a residue of a hydrophilic monocarboxylic acid. In yet another embodiment, the cellulose esters containing carboxylic acid functionality are cellulose acetate phthalates, which can be prepared by reacting cellulose acetate with phthalic anhydride.

Bifunctional reactants to produce cellulose esters containing acetoacetate functionality are described in U.S. Pat. No. 5,292,877, which is incorporated by reference to the extent it does not contradict the statements herein. In one embodiment, the cellulose esters containing acetoacetate functionality are produced by contacting: (i) cellulose; (ii) diketene, an alkyl acetoacetate, 2,2,6, trimethyl-4H 1,3-dioxin-4-one, or a mixture thereof, and (iii) a solubilizing amount of solvent system comprising lithium chloride plus a carboxamide selected from the group consisting of 1-methyl-2-pyrrolidinone, N,N dimethylacetamide, or a mixture thereof.

Bifunctional reactants to produce cellulose esters containing acetoacetate imide functionality are described in U.S. Pat. No. 6,369,214, which is incorporated by reference to the extent it does not contradict the statements herein. Cellulose esters containing acetoacetate imide functionality are the reaction product of a cellulose ester and at least one acetoacetyl group and an amine functional compound comprising at least one primary amine.

Bifunctional reactants to produce cellulose esters containing mercapto functionality are described in U.S. Pat. No. 5,082,914, which is incorporated by reference to the extent it does not contradict the statements herein. In one embodiment of the invention, the cellulose ester is grafted with a silicon-containing thiol component which is either commercially available or can be prepared by procedures known in the art. Examples of silicon-containing thiol compounds include, but are not limited to, (3-mercaptopropyl)trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl)dimethylethoxysilane, (3-mercaptopropyl)diethyoxymethylsilane, and (3-mercapto-propyl)triethoxysilane.

Bifunctional reactants to produce cellulose esters containing melamine functionality are described in U.S. Pat. No. 5,182,379, which is incorporated by reference to the extent it does not contradict the statements herein. In one embodiment, the cellulose esters containing melamine functionality are prepared by reacting a cellulose ester with a melamine compound to form a grafted cellulose ester having melamine moieties grafted to the backbone of the anhydrogluclose rings of the cellulose ester. In one embodiment, the melamine compound is selected from the group consisting of methylol ethers of melamine and aminoplast carrier elastomers.

Bifunctional reactants to produce cellulose esters containing long alkyl chain functionality are described in U.S. Pat. No. 5,750,677, which is incorporated by reference to the extent it does not contradict the statements herein. In one embodiment, the cellulose esters containing long alkyl chain functionality are produced by reacting cellulose in carboxamide diluents or urea-based diluents with an acylating reagent using a titanium-containing species. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

In certain embodiments of the invention, the cellulose ester can be modified using one or more plasticizers. The plasticizer can form at least about 1, 2, 5, or 10 weight percent of the cellulose ester composition. Additionally or alternatively, the plasticizer can make up not more than about 60, 50, 40, or 35 weight percent of the cellulose ester composition. In one embodiment, the cellulose ester is a modified cellulose ester that was formed by modifying an initial cellulose ester with a plasticizer.

The plasticizer used for modification can be any that is known in the art that can reduce the melt temperature and/or the melt viscosity of the cellulose ester. The plasticizer can be either monomeric or polymeric in structure. In one embodiment, the plasticizer is at least one selected from the group consisting of a phosphate plasticizer, benzoate plasticizer, adipate plasticizer, a phthalate plasticizer, a glycolic acid ester, a citric acid ester plasticizer, and a hydroxyl-functional plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

In another embodiment of the invention, the plasticizer can be one or more esters comprising (i) at least one acid residue including residues of phthalic acid, adipic acid, trimellitic acid, succinic acid, benzoic acid, azelaic acid, terephthalic acid, isophthalic acid, butyric acid, glutaric acid, citric acid, and/or phosphoric acid; and (ii) alcohol residues comprising one or more residues of an aliphatic, cycloaliphatic, or aromatic alcohol containing up to about 20 carbon atoms.

In another embodiment of the invention, the plasticizer can comprise alcohol residues containing residues selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can comprise aliphatic polyesters containing C2-10 diacid residues such as, for example, malonic acid, succinic acid, glutaric acid, adipic acid, pimelic acid, suberic acid, azelaic acid, and sebacic acid; and C2-10 diol residues.

In another embodiment, the plasticizer can comprise diol residues which can be residues of at least one of the following C2-C10 diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2,000.

In another embodiment of the invention, the plasticizer comprises at least one of the following: Resoflex® R296 plasticizer, Resoflex® 804 plasticizer, SHP (sorbitol hexapropionate), XPP (xylitol pentapropionate), XPA (xylitol pentaacetate), GPP (glucose pentaacetate), GPA (glucose pentapropionate), and APP (arabitol pentapropionate).

In another embodiment of the invention, the plasticizer comprises one or more of: A) from about 5 to about 95 weight percent of a C2-C12 carbohydrate organic ester, wherein the carbohydrate comprises from about 1 to about 3 monosaccharide units; and B) from about 5 to about 95 weight percent of a C2-C12 polyol ester, wherein the polyol is derived from a C5 or C6 carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose, and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate, and β-glucose pentabutyrate.

In another embodiment, the plasticizer comprises at least one carbohydrate ester and the carbohydrate portion of the carbohydrate ester comprises an α-anomer, a β-anomer, or a mixture thereof.

In another embodiment of the invention, the plasticizer can be a solid, non-crystalline carrier elastomer. These carrier elastomers can contain some amount of aromatic or polar functionality and can lower the melt viscosity of the cellulose esters. In one embodiment of the invention, the plasticizer can be a solid, non-crystalline compound, such as, for example, a rosin; a hydrogenated rosin; a stabilized rosin, and their monofunctional alcohol esters or polyol esters; a modified rosin including, but not limited to, maleic- and phenol-modified rosins and their esters; terpene elastomers; phenol-modified terpene elastomers; coumarin-indene elastomers; phenolic elastomers; alkylphenol-acetylene elastomers; and phenol-formaldehyde elastomers.

In another embodiment of the invention, the plasticizer can be a tackifier resin. Any tackifier known to a person of ordinary skill in the art may be used in the cellulose ester/elastomer compositions. Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; and (8) aromatic modified aliphatic or cycloaliphatic hydrocarbon resins and the hydrogenated derivatives thereof; and combinations thereof.

In another embodiment of the invention, the tackifier resins include rosin-based tackifiers (e.g. AQUATAC® 9027, AQUATAC® 4188, SYLVALITE®, SYLVATAC® and SYL V AGUM® rosin esters from Arizona Chemical, Jacksonville, Fla.). In other embodiments, the tackifiers include polyterpenes or terpene resins (e.g., SYLVARES® 15 terpene resins from Arizona Chemical, Jacksonville, Fla.). In other embodiments, the tackifiers include aliphatic hydrocarbon resins such as resins resulting from the polymerization of monomers consisting of olefins and diolefins (e.g., ESCOREZ® 1310LC, ESCOREZO 2596 from ExxonMobil Chemical Company, Houston, Tex. or PICCOTAC® 1095 from Eastman Chemical Company, Kingsport, Tenn.) and the hydrogenated derivatives 20 thereof; alicyclic petroleum hydrocarbon resins and the hydrogenated derivatives thereof (e.g. ESCOREZ® 5300 and 5400 series from ExxonMobil Chemical Company; EASTOTAC® resins from Eastman Chemical Company). In some embodiments, the tackifiers include hydrogenated cyclic hydrocarbon resins (e.g. REGALREZ® and REGALITE® resins from Eastman Chemical Company). In further embodiments, the tackifiers are modified with tackifier modifiers including aromatic compounds (e.g., ESCOREZ® 2596 from ExxonMobil Chemical Company or PICCOTAC® 7590 from Eastman Chemical Company) and low softening point resins (e.g., AQUATAC 5527 from Arizona Chemical, Jacksonville, Fla.). In some embodiments, the tackifier is an aliphatic hydrocarbon resin having at least five carbon atoms.

In certain embodiments of the present invention, the cellulose ester can be modified using one or more compatibilizers. The compatibilizer can comprise at least about 1, 2, 3, or 5 weight percent of the cellulose ester composition. Additionally or alternatively, the compatibilizer can comprise not more than about 40, 30, 25, or 20 weight percent of the cellulose ester composition.

The compatibilizer can be either a non-reactive compatibilizer or a reactive compatibilizer. The compatibilizer can enhance the ability of the cellulose ester to reach a desired small particle size thereby improving the dispersion of the cellulose ester into an elastomer. The compatibilizers used can also improve mechanical and physical properties of the elastomeric compositions by enhancing the interfacial interaction/bonding between the cellulose ester and the elastomer.

When non-reactive compatibilizers are utilized, the compatibilizer can contain a first segment that is compatible with the cellulose ester and a second segment that is compatible with the elastomer. In this case, the first segment contains polar functional groups, which provide compatibility with the cellulose ester, including, but not limited to, such polar functional groups as ethers, esters, amides, alcohols, amines, ketones, and acetals. The first segment may include oligomers or polymers of the following: cellulose esters; cellulose ethers; polyoxyalkylene, such as, polyoxyethylene, polyoxypropylene, and polyoxybutylene; polyglycols, such as, polyethylene glycol, polypropylene glycol, and polybutylene glycol; polyesters, such as, polycaprolactone, polylactic acid, aliphatic polyesters, and aliphatic-aromatic copolyesters; polyacrylates and polymethacrylates; polyacetals; polyvinylpyrrolidone; polyvinyl acetate; and polyvinyl alcohol. In one embodiment, the first segment is polyoxyethylene or polyvinyl alcohol.

The second segment can be compatible with the elastomer and contain nonpolar groups. The second segment can contain saturated and/or unsaturated hydrocarbon groups. In one embodiment, the second segment can be an oligomer or a polymer. In another embodiment, the second segment of the non-reactive compatibilizer is selected from the group consisting of polyolefins, polydienes, polyaromatics, and copolymers.

In one embodiment, the first and second segments of the non-reactive compatibilizers can be in a diblock, triblock, branched, or comb structure. In this embodiment, the molecular weight of the non-reactive compatibilizers can range from about 300 to about 20,000, 500 to about 10,000, or 1,000 to about 5,000. The segment ratio of the non-reactive compatibilizers can range from about 15 to about 85 percent polar first segments to about 15 to about 85 percent nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are C11-C15 secondary alcohol ethoxylates, polyoxyethylene cetyl ether, polyoxyethylene stearyl ether, and C12-014 natural liner alcohol ethoxylated with ethylene oxide. C11-C15 secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. C12-C14 natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive compatibilizers can be synthesized in situ in the cellulose ester composition or the cellulose ester/primary elastomer composition by reacting cellulose ester-compatible compounds with elastomer-compatible compounds. These compounds can be, for example, telechelic oligomers, which are defined as prepolymers capable of entering into further polymerization or other reaction through their reactive end groups. In one embodiment of the invention, these in situ compatibilizers can have higher molecular weight from about 10,000 to about 1,000,000.

In another embodiment of the invention, the compatibilizer can be reactive. The reactive compatibilizer comprises a polymer or oligomer compatible with one component of the composition and functionality capable of reacting with another component of the composition. There are two types of reactive compatibilizers. The first reactive compatibilizer has a hydrocarbon chain that is compatible with a nonpolar elastomer and also has functionality capable of reacting with the cellulose ester. Such functional groups include, but are not limited to, carboxylic acids, anhydrides, acid chlorides, epoxides, and isocyanates. Specific examples of this type of reactive compatibilizer include, but are not limited to: long chain fatty acids, such as stearic acid (octadecanoic acid); long chain fatty acid chlorides, such as stearoyl chloride (octadecanoyl chloride); long chain fatty acid anhydrides, such as stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, such as terpolymers of ethylene, acrylic ester and maleic anhydride; and copolymers of glycidyl methacrylate with olefins and/or acrylic esters, such as terpolymers of ethylene, acrylic ester, and glycidyl methacrylate.

Reactive compatibilizers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

The second type of reactive compatibilizer has a polar chain that is compatible with the cellulose ester and also has functionality capable of reacting with a nonpolar elastomer. Examples of these types of reactive compatibilizers include cellulose esters or polyethylene glycols with olefin or thiol functionality. Reactive polyethylene glycol compatibilizers with olefin functionality include, but are not limited to, polyethylene glycol allyl ether and polyethylene glycol acrylate. An example of a reactive polyethylene glycol compatibilizer with thiol functionality includes polyethylene glycol thiol. An example of a reactive cellulose ester compatibilizer includes mercaptoacetate cellulose ester.

(B) Primary Elastomers

The elastomeric composition of the present invention comprises at least one primary elastomer. The term "elastomer," as used herein, can be used interchangeably with the term "rubber." Due to the wide applicability of the process described herein, the cellulose esters can be employed with virtually any type of primary elastomer. For instance, the primary elastomers utilized in this invention can comprise a natural rubber, a modified natural rubber, a synthetic rubber, and mixtures thereof.

In certain embodiments of the present invention, at least one of the primary elastomers is a non-polar elastomer. For example, a non-polar primary elastomer can comprise at least about 90, 95, 98, 99, or 99.9 weight percent of non-polar monomers. In one embodiment, the non-polar primary elastomer is primarily based on a hydrocarbon. Examples of non-polar primary elastomers include, but are not limited to, natural rubber, polybutadiene rubber, polyisoprene rubber, styrene-butadiene rubber, polyolefins, ethylene propylene diene monomer (EPDM) rubber, and polynorbornene rubber. Examples of polyolefins include, but are not limited to, polybutylene, polyisobutylene, and ethylene propylene rubber. In another embodiment, the primary elastomer comprises a natural rubber, a styrene-butadiene rubber, and/or a polybutadiene rubber.

In certain embodiments, the primary elastomer contains little or no nitrile groups. As used herein, the primary elastomer is considered a "non-nitrile" primary elastomer when nitrile monomers make up less than 10 weight percent of the primary elastomer. In one embodiment, the primary elastomer contains no nitrile groups.

(C) Fillers

In certain embodiments, the elastomeric composition of the present invention can comprise one or more fillers.

The fillers can comprise any filler that can improve the thermophysical properties of the elastomeric composition (e.g., modulus, strength, and expansion coefficient). For example, the fillers can comprise silica, carbon black, clay, alumina, talc, mica, discontinuous fibers including cellulose fibers and glass fibers, aluminum silicate, aluminum trihydrate, barites, feldspar, nepheline, antimony oxide, calcium carbonate, kaolin, and combinations thereof. In one embodiment, the fillers comprise an inorganic and nonpolymeric material. In another embodiment, the fillers comprise silica and/or carbon black. In yet another embodiment, the fillers comprise silica.

In certain embodiments, the elastomeric composition can comprise at least about 5, 10, 15, 20, 25, 30, 35, 40, 45, or 50 phr of one or more fillers, based on the total weight of the elastomers. Additionally or alternatively, the elastomeric composition can comprise not more than about 150, 140, 130, 120, 110, 100, 90, 80, 70, or 60 phr of one or more fillers, based on the total weight of the elastomers.

In certain embodiments, the elastomeric composition is a highly-filled elastomeric composition. As used herein, a "highly-filled" elastomeric composition comprises at least about 60 phr of one or more fillers, based on the total weight of the elastomers. In one embodiment, a highly-filled elastomeric composition comprises at least about 65, 70, 75, 80, 85, 90, or 95 phr of one or more fillers, based on the total weight of the elastomers. Additionally or alternatively, the highly-filled elastomeric composition can comprise not more than about 150, 140, 130, 120, 110, or 100 phr of one or more fillers, based on the total weight of the elastomers.

In certain embodiments, the elastomeric composition is not highly-filled and contains minor amounts of filler. In such an embodiment, the elastomeric composition can comprise at least about 5, 10, or 15 phr and/or not more than about 60, 50, or 40 phr of one or more fillers, based on the total weight of the elastomers.

(D) Optional Additives

The elastomeric composition of the present invention can comprise one or more additives.

In certain embodiments, the elastomeric composition can comprise at least about 1, 2, 5, 10, or 15 phr of one or more additives, based on the total weight of the elastomers. Additionally or alternatively, the elastomeric composition can comprise not more than about 70, 50, 40, 30, or phr of one or more additives, based on the total weight of the elastomers.

The additives can comprise, for example, processing aids, carrier elastomers, tackifiers, lubricants, oils, waxes, surfactants, stabilizers, UV absorbers/inhibitors, pigments, antioxidants, extenders, reactive coupling agents, and/or branchers. In one embodiment, the additives comprise one or more cellulose ethers, starches, and/or derivatives thereof. In such an embodiment, the cellulose ethers, starches and/or derivatives thereof can include, for example, amylose, acetoxypropyl cellulose, amylose triacetate, amylose tributyrate, amylose tricabanilate, amylose tripropionate, carboxymethyl amylose, ethyl cellulose, ethyl hydroxyethyl cellulose, hydroxyethyl cellulose, methyl cellulose, sodium carboxymethyl cellulose, and sodium cellulose xanthanate.

In one embodiment, the additives comprise a non-cellulose ester processing aid. The non-cellulose ester processing aid can comprise, for example, a processing oil, starch, starch derivatives, and/or water. In such an embodiment, the elastomeric composition can comprise less than about 10, 5, 3, or 1 phr of the non-cellulose ester processing aid, based on the total weight of the elastomers. Additionally or alternatively, the elastomeric composition can exhibit a weight ratio of cellulose ester to non-cellulose ester processing aid of at least about 0.5:1, 1:1, 2:1, 3:1, 4:1, 5:1, 8:1, or 10:1.

In another embodiment, the elastomeric composition can comprise a starch and/or its derivatives. In such an embodiment, the elastomeric composition can comprise less than 10, 5, 3, or 1 phr of starch and its derivatives, based on the total weight of the elastomers. Additionally or alternatively, the elastomeric composition can exhibit a weight ratio of cellulose ester to starch of at least about 3:1, 4:1, 5:1, 8:1, or 10:1.

(E) Processes for Producing Elastomeric Compositions

The elastomeric compositions of the present invention can be produced by two different types of processes. The first process involves directly melt dispersing the cellulose ester into a primary elastomer. The second process involves mixing a cellulose ester with a carrier elastomer to produce a cellulose ester concentrate, and then blending the cellulose ester concentrate with a primary elastomer.

In the first process, a cellulose ester is blended directly with a primary elastomer to produce an elastomeric composition. In certain embodiments, the first process comprises: a) blending at least one primary elastomer, at least one cellulose ester, and, optionally, one or more fillers for a sufficient time and temperature to disperse the cellulose ester throughout the primary elastomer so as to produce the elastomeric composition. A sufficient temperature for blending the cellulose ester and the primary elastomer can be the flow temperature of the cellulose ester, which is higher than the Tg of the cellulose ester by at least about 10° C., 15° C., 20° C., 25° C., 30° C., 35° C., 40° C., 45° C., or 50° C. The temperature of the blending can be limited by the primary elastomer's upper processing temperature range and the lower processing temperature range of the cellulose ester.

The primary elastomer, cellulose ester, fillers, and additives can be added or combined in any order during the process. In one embodiment, the cellulose ester can be modified with a plasticizer and/or compatibilizer prior to being blended with the primary elastomer.

In certain embodiments of the first process, at least a portion of the blending can occur at temperatures of at least about 80° C., 100° C., 120° C., 130° C., or 140° C. Additionally or alternatively, at least a portion of the blending can occur at temperatures of not more than about 220° C., 200° C., 190° C., 170° C., or 160° C.

During this first process, the cellulose esters can effectively soften and/or melt, thus allowing the cellulose esters to form into sufficiently small particle sizes under the specified blending conditions. In such an embodiment, due to the small particle sizes, the cellulose esters can be thoroughly dispersed throughout the primary elastomer during the process. In one embodiment, the particles of the cellulose ester in the elastomeric composition have a spherical or near-spherical shape. As used herein, a "near-spherical" shape is understood to include particles having a cross-sectional aspect ratio of less than 2:1. In more particular embodiments, the spherical and near-spherical particles have a cross-sectional aspect ratio of less than 1.5:1, 1.2:1, or 1.1:1. The "cross-sectional aspect ratio" as used herein is the ratio of the longest dimension of the particle's cross-section relative to its shortest dimension. In a further embodiment, at least about 75, 80, 85, 90, 95, or 99.9 percent of the particles of cellulose esters in the elastomeric composition have a cross-sectional aspect ratio of not more than about 10:1, 8:1, 6:1, or 4:1.

In certain embodiments, at least about 75, 80, 85, 90, 95, or 99.9 percent of the cellulose ester particles have a diameter of not more than about 10, 8, 5, 4, 3, 2, or 1 µm subsequent to blending the cellulose ester with the primary elastomer.

In certain embodiments, the cellulose esters added at the beginning of the process are in the form of a powder having particle sizes ranging from 200 to 400 µm. In such an embodiment, subsequent to blending the cellulose ester into the primary elastomer, the particle sizes of the cellulose ester can decrease by at least about 50, 75, 90, 95, or 99 percent relative to their particle size prior to blending.

In certain embodiments, the fillers can have a particle size that is considerably smaller than the size of the cellulose ester particles. For instance, the fillers can have an average particle size that is not more than about 50, 40, 30, 20, or 10 percent of the average particle size of the cellulose ester particles in the elastomeric composition.

In the second process, a cellulose ester is first mixed with a carrier elastomer to produce a cellulose ester concentrate (i.e., a cellulose ester masterbatch), which can subsequently be blended with a primary elastomer to produce the elastomeric composition. This second process may also be referred to as the "masterbatch process." One advantage of this masterbatch process is that it can more readily disperse cellulose esters having a higher Tg throughout the primary elastomer. In one embodiment, the masterbatch process involves mixing a high Tg cellulose ester with a compatible carrier elastomer to produce a cellulose ester concentrate, and then blending the cellulose ester concentrate with at least one primary elastomer to produce the elastomeric composition.

In certain embodiments, the masterbatch process comprises the following steps: a) mixing at least one cellulose ester with at least one carrier elastomer for a sufficient time and temperature to mix the cellulose ester and the carrier elastomer to thereby produce a cellulose ester concentrate; and b) blending the cellulose ester concentrate and at least one primary elastomer to produce the elastomeric composition. A sufficient temperature for mixing the cellulose ester and the carrier elastomer can be the flow temperature of the cellulose ester, which is higher than the Tg of the cellulose ester by at least about 10° C., 15° C., 20° C., 25° C., 30° C., 35° C., 40° C., 45° C., or 50° C. In one embodiment of the masterbatch process, the cellulose ester has a Tg of at least about 90° C., 95° C., 100° C., 105° C., or 110° C. Additionally or alternatively, the cellulose ester can have a Tg of not more than about 200° C., 180° C., 170° C., 160° C., or 150° C. In a further embodiment, at least a portion of the mixing of step (a) occurs at a temperature that is at least 10° C., 15° C., 20° C., 30° C., 40° C., or 50° C. greater than the temperature of the blending of step (b).

In certain embodiments, at least a portion of the mixing of the cellulose ester and the carrier elastomer occurs at a temperature of at least about 170° C., 180° C., 190° C., 200° C., or 210° C. Additionally or alternatively, at least a portion of the mixing of the cellulose ester and the carrier elastomer occurs at a temperature below 260° C., 250° C., 240° C., 230° C., or 220° C.

In certain embodiments, at least a portion of the blending of the cellulose ester concentrate and the primary elastomer occurs at a temperature that will not degrade the primary elastomer. For instance, at least a portion of the blending can occur at a temperature of not more than about 180° C., 170° C., 160° C., or 150° C.

Fillers and/or additives can be added during any step of the masterbatch process. In one embodiment, the cellulose ester can be modified with a plasticizer or compatibilizer prior to the masterbatch process.

In certain embodiments, at least a portion of the cellulose ester concentrate can be subjected to fibrillation prior to being blended with the primary elastomer. In such embodiments, the resulting fibrils of the cellulose ester concentrate can have an aspect ratio of at least about 2:1, 4:1, 6:1, or 8:1. In an alternative embodiment, at least a portion of the cellulose ester concentrate can be pelletized or granulated prior to being blended with the primary elastomer.

In certain embodiments, the cellulose ester concentrate can comprise at least about 10, 15, 20, 25, 30, 35, or 40 weight percent of at least one cellulose ester. Additionally or alternatively, the cellulose ester concentrate can comprise not more than about 90, 85, 80, 75, 70, 65, 60, 55, or 50 weight percent of at least one cellulose ester. In one embodiment, the cellulose ester concentrate can comprise at least about 10, 15, 20, 25, 30, 35, or 40 weight percent of at least one carrier elastomer. Additionally or alternatively, the cellulose ester concentrate can comprise not more than about 90, 85, 80, 75, 70, 65, 60, 55, or 50 weight percent of at least one carrier elastomer.

Similar to the first process, the cellulose esters can effectively soften and/or melt during the masterbatch process, thus allowing the cellulose esters to form into sufficiently small particle sizes under the specified blending conditions. In such an embodiment, due to the small particle sizes, the cellulose esters can be thoroughly dispersed throughout the elastomeric composition after the process. In one embodiment, the particles of cellulose ester in the elastomeric composition have a spherical or near-spherical shape. In one embodiment, subsequent to blending the cellulose ester concentrate with the primary elastomer, the cellulose esters are in the form of spherical and near-spherical particles having a cross-sectional aspect ratio of less than 2:1, 1.5:1, 1.2:1, or 1.1:1. In a further embodiment, subsequent to blending the cellulose ester concentrate with the primary elastomer, at least about 75, 80, 85, 90, 95, or 99.9 percent of the particles of cellulose esters have a cross-sectional aspect ratio of not more than about 2:1, 1.5:1, 1.2:1, or 1.1:1.

In certain embodiments, at least about 75, 80, 85, 90, 95, or 99.9 percent of the cellulose ester particles have a diameter of not more than about 10, 8, 5, 4, 3, 2, or 1 μm subsequent to blending the cellulose ester concentrate with the primary elastomer.

In certain embodiments, the cellulose esters added at the beginning of the masterbatch process are in the form of a powder having particle sizes ranging from 200 to 400 μm. In such an embodiment, subsequent to blending the cellulose ester concentrate with the primary elastomer, the particle sizes of the cellulose ester can decrease by at least about 90, 95, 98, 99, or 99.5 percent relative to their particle size prior to the masterbatch process.

The carrier elastomer can be virtually any uncured elastomer that is compatible with the primary elastomer and that can be processed at a temperature exceeding 160° C. The carrier elastomer can comprise, for example, styrene block copolymers, polybutadienes, natural rubbers, synthetic rubbers, acrylics, maleic anhydride modified styrenics, recycled rubber, crumb rubber, powdered rubber, isoprene rubber, nitrile rubber, and combinations thereof. The styrene block copolymers can include, for example, styrene-butadiene block copolymers and styrene ethylene-butylene block copolymers having a styrene content of at least about 5, 10, or 15 weight percent and/or not more than about 40, 35, or 30 weight percent. In one embodiment, the carrier elastomers have a Tg that is less than the Tg of the cellulose ester.

In certain embodiments, the carrier elastomer comprises styrene block copolymers, polybutadienes, natural rubbers, synthetic rubbers, acrylics, maleic anhydride modified styrenics, and combinations thereof. In one embodiment, the carrier elastomer comprises 1,2 polybutadiene. In another embodiment, the carrier elastomer comprises a styrene block copolymer. In yet another embodiment, the carrier elastomer comprises a maleic anhydride-modified styrene ethylene-butylene elastomer.

In certain embodiments, the melt viscosity ratio of the cellulose ester to the carrier elastomer is at least about 0.1, 0.2, 0.3, 0.5, 0.8, or 1.0 as measured at 170° C. and a shear rate of 400 s$^{-1}$. Additionally or alternatively, the melt viscosity ratio of the cellulose ester to the carrier elastomer is not more than about 2, 1.8, 1.6, 1.4, or 1.2 as measured at 170° C. and a shear rate of 400 s$^{-1}$.

In certain embodiments, the melt viscosity ratio of the cellulose ester concentrate to the primary elastomer is at least about 0.1, 0.2, 0.3, 0.5, 0.8, or 1.0 as measured at 160° C. and a shear rate of 200 s$^{-1}$. Additionally or alternatively, the melt viscosity ratio of the cellulose ester concentrate to the primary elastomer is not more than about 2, 1.8, 1.6, 1.4, or 1.2 as measured at as measured at 160° C. and a shear rate of 200 s$^{-1}$.

In certain embodiments, the cellulose ester exhibits a melt viscosity of at least about 75,000, 100,000, or 125,000 poise as measured at 170° C. and a shear rate of 1 rad/sec. Additionally or alternatively, the cellulose ester can exhibit a melt viscosity of not more than about 1,000,000, 900,000, or 800,000 poise as measured at 170° C. and a shear rate of 1 rad/sec. In another embodiment, the carrier elastomer exhibits a melt viscosity of at least about 75,000, 100,000, or 125,000 poise as measured at 170° C. and a shear rate of 1 rad/sec. Additionally or alternatively, the carrier elastomer can exhibit a melt viscosity of not more than about 2,000,000, 1,750,000, or 1,600,000 poise as measured at 170° C. and a shear rate of 1 rad/sec.

In certain embodiments, the cellulose ester exhibits a melt viscosity of at least about 25,000, 40,000, or 65,000 poise as measured at 170° C. and a shear rate of 10 rad/sec. Additionally or alternatively, the cellulose ester can exhibit a melt viscosity of not more than about 400,000, 300,000, or 200,000 poise as measured at 170° C. and a shear rate of 10 rad/sec. In another embodiment, the carrier elastomer exhibits a melt viscosity of at least about 20,000, 30,000, or 40,000 poise as measured at 170° C. and a shear rate of 10 rad/sec. Additionally or alternatively, the carrier elastomer can exhibit a melt viscosity of not more than about 500,000, 400,000, or 300,000 poise as measured at 170° C. and a shear rate of 10 rad/sec.

In certain embodiments, the cellulose ester exhibits a melt viscosity of at least about 10,000, 15,000, or 20,000 poise as measured at 170° C. and a shear rate of 100 rad/sec. Additionally or alternatively, the cellulose ester can exhibit a melt viscosity of not more than about 100,000, 75,000, or 50,000 poise as measured at 170° C. and a shear rate of 100 rad/sec. In another embodiment, the carrier elastomer exhibits a melt viscosity of at least about 10,000, 15,000, or 20,000 poise as measured at 170° C. and a shear rate of 100 rad/sec. Additionally or alternatively, the carrier elastomer can exhibit a melt viscosity of not more than about 100,000, 75,000, or 50,000 poise as measured at 170° C. and a shear rate of 100 rad/sec.

In certain embodiments, the cellulose ester exhibits a melt viscosity of at least about 2,000, 5,000, or 8,000 poise as measured at 170° C. and a shear rate of 400 rad/sec. Additionally or alternatively, the cellulose ester can exhibit a melt viscosity of not more than about 30,000, 25,000, or 20,000 poise as measured at 170° C. and a shear rate of 400 rad/sec. In another embodiment, the carrier elastomer exhibits a melt viscosity of at least about 1,000, 4,000, or 7,000 poise as measured at 170° C. and a shear rate of 400 rad/sec. Additionally or alternatively, the carrier elastomer can exhibit a melt viscosity of not more than about 30,000, 25,000, or 20,000 poise as measured at 170° C. and a shear rate of 400 rad/sec.

In certain embodiments, the carrier elastomer contains little or no nitrile groups. As used herein, the carrier elastomer is considered a "non-nitrile" carrier elastomer when nitrile monomers make up less than 10 weight percent of the carrier elastomer. In one embodiment, the carrier elastomer contains no nitrile groups.

In one embodiment, the carrier elastomer is the same as the primary elastomer. In another embodiment, the carrier elastomer is different from the primary elastomer.

The elastomeric compositions produced using either of the above processes can be subjected to curing to thereby produce a cured elastomeric composition. The curing can be accomplished using any conventional method, such as curing under conditions of elevated temperature and pressure for a suitable period of time. For example, the curing process can involve subjecting the elastomeric composition to a temperature of at least 160° C. over a period of at least 15 minutes. Examples of curing systems that can be used include, but are not limited to, sulfur-based systems, resin-curing systems, soap/sulfur curing systems, urethane cross-linking agents, bisphenol curing agents, silane crosslinking, isocyanates, poly-functional amines, high-energy radiation, metal oxide crosslinking, and/or peroxide cross-linking.

The mixing and blending of the aforementioned processes can be accomplished by any method known in the art that is sufficient to mix cellulose esters and elastomers. Examples of mixing equipment include, but are not limited to, Banbury mixers, Brabender mixers, roll mills, planetary mixers, single screw extruders, and twin screw extruders. The shear energy during the mixing is dependent on the combination of equipment, blade design, rotation speed (rpm), and mixing time. The shear energy should be sufficient for breaking down softened/melted cellulose ester to a small enough size to disperse the cellulose ester throughout the primary elastomer. For example, when a Banbury mixer is utilized, the shear energy and time of mixing can range from about 5 to about 15 minutes at 100 rpms. In certain embodiments of the present invention, at least a portion of the blending and/or mixing stages discussed above can be carried out at a shear rate of at least about 50, 75, 100, 125, or 150 s$^{-1}$. Additionally or alternatively, at least a portion of the blending and/or mixing stages discussed above can be carried out at a shear rate of not more than about 1,000, 900, 800, 600, or 550 s$^{-1}$.

It is known in the art that the efficiency of mixing two or more viscoelastic materials can depend on the ratio of the viscosities of the viscoelastic materials. For a given mixing equipment and shear rate range, the viscosity ratio of the dispersed phase (cellulose ester, fillers, and additives) and continuous phase (primary elastomer) should be within specified limits for obtaining adequate particle size. In one embodiment of the invention where low shear rotational shearing equipment is utilized, such as, Banbury and Brabender mixers, the viscosity ratio of the dispersed phase (e.g., cellulose ester, fillers, and additives) to the continuous phase (e.g., primary elastomer) can range from about 0.001 to about 5, from about 0.01 to about 5, and from about 0.1 to about 3. In yet another embodiment of the invention where high shear rotational/extensional shearing equipment is utilized, such as, twin screw extruders, the viscosity ratio of the dispersed phase (e.g., cellulose ester, fillers, and additives) to the continuous phase (e.g., primary elastomer) can range from about 0.001 to about 500 and from about 0.01 to about 100.

It is also known in the art that when mixing two or more viscoelastic materials, the difference between the interfacial energy of the two viscoelastic materials can affect the efficiency of mixing. Mixing can be more efficient when the difference in the interfacial energy between the materials is minimal. In one embodiment of the invention, the surface tension difference between the dispersed phase (e.g., cellulose ester, fillers, and additives) and continuous phase (e.g., primary elastomer) is less than about 100 dynes/cm, less than 50 dynes/cm, or less than 20 dynes/cm.

(F) Elastomeric Compositions

The elastomeric compositions of the present invention can exhibit a number of improvements associated with processability, strength, modulus, and elasticity.

In certain embodiments, the uncured elastomeric composition exhibits a Mooney Viscosity as measured at 100° C. and according to ASTM D 1646 of not more than about 110, 105, 100, 95, 90, or 85 AU. A lower Mooney Viscosity makes the uncured elastomeric composition easier to process. In another embodiment, the uncured elastomeric composition exhibits a Phillips Dispersion Rating of at least 6.

In certain embodiments, the uncured elastomeric composition exhibits a scorch time of at least about 1.8, 1.9, 2.0, 2.1, or 2.2 Ts2, min. A longer scorch time enhances processability in that it provides a longer time to handle the elastomeric composition before curing starts. The scorch time of the samples was tested using a cure rheometer (Oscillating Disk Rheometer (ODR)) and was performed according to ASTM D 2084. As used herein, "ts2" is the time it takes for the torque of the rheometer to increase 2 units above the minimum value and "tc90" is the time to it takes to reach 90 weight percent of the difference between minimum to maximum torque. In another embodiment, the uncured elastomeric composition exhibits a cure time of not more than about 15, 14, 13, 12, 11, or 10 tc90, min. A shorter cure time indicates improved processability because the elastomeric compositions can be cured at a faster rate, thus increasing production.

In certain embodiments, the cured elastomeric composition exhibits a Dynamic Mechanical Analysis ("DMA") strain sweep modulus as measured at 5% strain and 30° C. of at least about 1,400,000, 1,450,000, 1,500,000, 1,600,000, 1,700,000, or 1,800,000 Pa. A higher DMA strain sweep modulus indicates a higher modulus/hardness. The DMA Strain Sweep is tested using a Metravib DMA150 dynamic mechanical analyzer under 0.001 to 0.5 dynamic strain at 13 points in evenly spaced log steps at 30° C. and 10 Hz.

In certain embodiments, the cured elastomeric composition exhibits a molded groove tear as measured according to ASTM D624 of at least about 120, 125, 130, 140, 150, 155, 160, 165, or 170 lbf/in.

In certain embodiments, the cured elastomeric composition exhibits a peel tear as measured according to ASTM D1876-01 of at least about 80, 85, 90, 95, 100, 110, 120, or 130 lbf/in.

In certain embodiments, the cured elastomeric composition exhibits a break strain as measured according to ASTM D412 of at least about 360, 380, 400, 420, 425, or 430 percent. In another embodiment, the cured elastomer composition exhibits a break stress as measured according to ASTM D412 of at least 2,600, 2,800, 2,900, or 3,000 psi. The break strain and break stress are both indicators of the toughness and stiffness of the elastomeric compositions.

In certain embodiments, the cured elastomeric composition exhibits a tan delta at 0° C. and 5% strain in tension of not more than about 0.100, 0.105, 0.110, or 0.115. In another embodiment, the cured elastomeric composition exhibits a tan delta at 30° C. and 5% strain in shear of not more than about 0.25, 0.24, 0.23, 0.22, or 0.21. The tan deltas were measured using a TA Instruments dynamic mechanical analyzer to complete temperature sweeps using tensile geometry. The tan deltas (=E"/E') (storage modulus (E') and loss modulus (E")) were measured as a function of temperature from −80° C. to 120° C. using 10 Hz frequency, 5% static, and 0.2% dynamic strain.

In certain embodiments, the cured elastomeric composition exhibits an adhesion strength at 100° C. of at least about 30, 35, 40, or 45 lbf/in. The adhesion strength at 100° C. is measured using 180-degree T-peel geometry.

In certain embodiments, the cured elastomeric composition exhibits a Shore A hardness of at least about 51, 53, 55, or 57. The Shore A hardness is measured according to ASTM D2240.

(G) Tires Incorporating the Elastomeric Compositions

The elastomeric compositions of the present invention can be used to produce and/or be incorporated into tires.

In certain embodiments, the elastomeric composition is formed into a tire and/or a tire component. The tires can include, for example, passenger tires, light truck tires, heavy duty truck tires, off-road tires, recreational vehicle tires, and farm tires. The tire component can comprise, for example, tire tread, subtread, undertread, body plies, belts, overlay cap plies, belt wedges, shoulder inserts, tire apex, tire sidewalls, bead fillers, and any other tire component that contains an elastomer. In one embodiment, the elastomeric composition is formed into tire tread, tire sidewalls, and/or bead fillers.

In one embodiment, the elastomeric composition of the present invention can be used in the production of pneumatic tires. FIG. 1 is a sectional view showing an example of a pneumatic tire 10 of the present invention. The pneumatic tire 10 has a tread portion 12, a pair of sidewall portions 14 extending from both ends of the tread portion 12 inwardly in the radial direction of the tire, and a bead filler 16 located at the inner end of each sidewall portion 14. A body ply 18 is provided to extend between the bead portions 16 to reinforce the tread 12 and sidewalls 14. A first steel belt 20 and a second steel belt 22 are incorporated into the tire to provide strength and adhesion amongst the components. A belt wedge 24 can be incorporated between the steel belts to provide adhesion between the steel belts and enhance tear resistance. The pneumatic tire 10 also includes an inner liner 26 that reinforces the internal body of the tire and enhances air impermeability. In addition, a shoulder insert 28, subtread 30, and undertread 32 are provided to further support the tread 12 and body ply 18. Finally, the tire 10 has a cap ply (overlay) 34 to further reinforce the body ply 18 during use.

The pneumatic tire can be produced from the elastomeric composition of the present invention using any conventionally known method. In particular, the uncured elastomeric composition can be extruded and processed in conformity with the shape of the desired tire component and then effectively cured to form the tire component.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Elastomeric compositions containing varying amounts of cellulose ester were compared to elastomeric compositions not containing any cellulose ester. The elastomeric compositions were produced according to the formulations and parameters in TABLE 1. Examples 1 and 2 contained varying amounts of cellulose ester, while no cellulose ester was added to Comparative Examples 1 and 2.

TABLE 1

| Ingredient | Component | Example 1 | Example 2 | Comparative Example 1 | Comparative Example 2 |
|---|---|---|---|---|---|
| STAGE 1 | | | | | |
| BUNA VSL 5025-2 HM | S-SBR extended with 37.5 phr TDAE | 89.38 | 89.38 | 89.38 | 89.38 |
| BUNA CB 22 | PBD Rubber | 35 | 35 | 35 | 35 |
| ULTRASIL 7000 GR | Silica | 65 | 65 | 65 | 65 |
| N234 | Carbon black | 15 | 15 | 15 | 15 |
| Si 266 | Coupling agent | 5.08 | 5.08 | 5.08 | 5.08 |
| SUNDEX 790 | Aromatic oil | — | — | — | 8.75 |
| Stearic acid | Cure Activator | 1.5 | 1.5 | 1.5 | 1.5 |
| Product of Stage 1 | MB1 | 210.96 | 210.96 | 210.96 | 219.71 |
| STAGE 2 | | | | | |
| Product of Stage 1 | MB1 | 210.96 | 210.96 | 210.96 | 219.71 |
| CAB-551-0.01 | Cellulose Ester | 7 | 15 | — | — |
| Si 69 | Coupling agent | 0.546 | 1.17 | — | — |
| Zinc oxide | Cure activator | 1.9 | 1.9 | 1.9 | 1.9 |
| OKERIN WAX 7240 | Microcrystalline wax | 1.5 | 1.5 | 1.5 | 1.5 |
| SANTOFLEX 6PPD | Antioxidant | 2 | 2 | 2 | 2 |
| Product of Stage 2 | MB2 | 223.91 | 232.53 | 216.36 | 225.11 |
| STAGE 3 | | | | | |
| Product of Stage 2 | MB2 | 223.91 | 232.53 | 216.36 | 225.11 |
| Sulfur | Cross-linker | 1.28 | 1.28 | 1.28 | 1.28 |
| SANTOCURE CBS | Accelerator | 1.1 | 1.1 | 1.1 | 1.1 |
| PERKACIT DPG-grs | Accelerator | 1.28 | 1.28 | 1.28 | 1.28 |
| TOTAL | | 227.57 | 236.19 | 220.02 | 228.77 |

The elastomeric compositions were prepared by first blending a solution of styrene-butadiene rubber extended with 37.5 phr of TDAE oil (Buna VSL 5025-2 HM from Lanxess, Cologne, Germany), a polybutadiene rubber (Buna C 22 from Lanxess, Cologne, Germany); silica, carbon black, a coupling agent (Si 266), and a cure activator (i.e., stearic acid) in a Banbury mixer to create a first masterbatch. In addition, aromatic processing oil (Sundex® 790 from Petronas Lubricants, Belgium) was added to the first masterbatch used to produce Comparative Example 2. The first masterbatches were blended and produced according to the parameters listed in Stage 1 of TABLES 1 and 2.

The first masterbatch for all examples was subsequently blended with a cure activator, a microcrystalline wax, and an antioxidant to produce a second masterbatch. Additionally, a cellulose ester (CAB-551-0.01 from Eastman Chemical Kingsport, Tenn.) and a coupling agent (S169 from Evonik Degussa, Koln, Germany) were added to the first masterbatches used to produce Examples 1 and 2. The second masterbatches were blended and produced according to the parameters listed in Stage 2 of TABLES 1 and 2.

The second masterbatch for all examples was blended with a crosslinker and two different accelerators (Santocure® CBS and Perkacit® DPG-grs from Solutia, St. Louis, Mo.). The second masterbatches were processed according to the parameters listed in Stage 3 of TABLES 1 and 2. After processing, the second masterbatches were cured for 30 minutes at 160° C.

Mechanical Analyzer in shear deformation to perform a double strain sweep experiment that utilized a simple shear of 10 mm×2 mm. The experimental conditions were 0.001 to 0.5 dynamic strain at 13 points in evenly spaced log steps at 30° C. and 10 Hz.

The Hot Molded Groove Trouser Tear was measured at 100° C. according to ASTM test method D624.

The Peel Tear (adhesion to self at 100° C.) was measured using 180° T-peel geometry and according to ASTM test method D1876-01 with a modification. The standard 1"×6" peel test piece was modified to reduce the adhesion test area with a Mylar window. The window size was 3"×0.125" and the pull rate was 2"/min.

TABLE 2

|  | STAGE 1 | STAGE 2 | STAGE 3 |
| --- | --- | --- | --- |
| Start Temperature | 65° C. | 65° C. | 50° C. |
| Starting Rotor Speed (RPM) | 65 | 65 | 60 |
| Fill Factor | 67% | 64% | 61% |
| Ram Pressure | 50 | 50 | 50 |
| Mix Sequence | Add primary elastomers<br>After 1 minute, add ⅔ silica + Si266<br>After 2 minutes, add ⅓ silica + other components<br>After 3 minutes, sweep<br>After 3.5 minutes, adjust rotor speed to increase temperature to 160° C. | Add half of first master batch<br>After 15 seconds, add other components and other half of first master batch<br>After 1 minute, sweep<br>After 1.5 minutes, adjust rotor speed to increase temperature to 150° C. | Add half of second master batch<br>After 15 seconds, add sulfur, accelerator package, and other half of second master batch<br>After 1 minute, sweep |
| Dump Conditions | Hold for 2 minutes at 160° C. | Hold for 4 minutes at 150° C. | Hold for 2.5 minutes at 110° C. |
| Total Time | 6.5 minutes | 7.5 minutes | 3.75 minutes |

Example 2

Various performance properties of the elastomeric compositions produced in Example 1 were tested.

The break stress and break strain were measured as per ASTM D412 using a Die C for specimen preparation. The specimen had a width of 1 inch and a length of 4.5 inches. The speed of testing was 20 inches/min and the gauge length was 63.5 mm (2.5 inch). The samples were conditioned in the lab for 40 hours at 50%+/−5% humidity and at 72° F. (22° C.).

The Mooney Viscosities were measured at 100° C. according to ASTM D 1646.

The Phillips Dispersion Rating was calculated by cutting the samples with a razor blade and subsequently taking pictures at 30× magnification with an Olympus SZ60 Zoom Stereo Microscope interfaced with a PAXCAM ARC digital camera and a Hewlett Packard 4600 color printer. The pictures of the samples were then compared to a Phillips standard dispersion rating chart having standards ranging from 1 (bad) to 10 (excellent).

The Dynamic Mechanical Analysis ("DMA") Strain Sweep was tested using a Metravib DMA150 Dynamic The results of these tests are depicted in TABLE 3 for each elastomeric composition. TABLE 3 shows that the addition of cellulose esters and aromatic processing oils can reduce the Mooney Viscosity of the elastomeric composition, thus indicating better processability. Comparative Example 1, which did not contain either component, exhibited a high Mooney Viscosity, thus indicating poorer processability. Further, the addition cellulose esters increased the DMA Strain Sweep, thus these elastomeric compositions exhibited improved hardness and handling properties. In contrast, Comparative Example 2, which utilized an aromatic processing oil to lower its Mooney Viscosity, exhibited a low DMA Strain Sweep. Thus, while the aromatic processing oil led to a decrease in the Mooney Viscosity, it resulted in an undesirable decrease in the elastomeric composition's handling and hardness properties. Moreover, elastomeric compositions containing cellulose esters exhibited a higher tear strength, as depicted by the molded groove tear and peel tear at 100° C., relative to the comparative examples. Furthermore, TABLE 3 shows that the addition of an aromatic processing oil, like in Comparative Example 2, had little to no impact on tear strength.

TABLE 3

| Sample | Break Stress (psi) | Break Strain % | Mooney viscosity (AU) | Phillips Dispersion Rating | DMA Strain Sweep (5% strain in shear) (Pa) | Molded Groove Tear at 100° C. (lbf/in) | Peel Tear at 100° C. (lbf/in) |
| --- | --- | --- | --- | --- | --- | --- | --- |
| Example 1 | 3031 | 432 | 90.9 | 7 | 1740000 | 172 | 102 |
| Example 2 | 3017 | 447 | 88.4 | 6 | 1830000 | 160 | 135 |
| Comparative Example 1 | 2915 | 358 | 98.1 | 6 | 1680000 | 126 | 81.1 |
| Comparative Example 2 | 2785 | 405 | 83.7 | 5 | 1400000 | 123 | 94 |

Example 3

In this example, elastomeric compositions were produced using the masterbatch process. A number of different cellulose ester concentrates were prepared and subsequently combined with elastomers to produce the elastomeric compositions.

In the first stage of the masterbatch process, cellulose esters were bag blended with styrenic block copolymer materials and then fed using a simple volumetric feeder into the chilled feed throat of a Leitstritz twin screw extruder to make cellulose ester concentrates (i.e., masterbatches). The various properties of the cellulose esters and styrenic block copolymer materials utilized in this first stage are depicted in TABLES 4 and 5. All of the recited cellulose esters in TABLE 4 are from Eastman Chemical Company, Kingsport, Tenn. All of the styrenic block copolymers in TABLE 5 are from Kraton Polymers, Houston, Tex. The Leistritz extruder is an 18 mm diameter counter-rotating extruder having an L/D of 38:1. Material was typically extruded at 300 to 350 RPM with a volumetric feed rate that maintained a screw torque value greater than 50 weight percent. Samples were extruded through a strand die, and quenched in a water bath, prior to being pelletized. Relative loading levels of cellulose esters and styrenic block copolymers were varied to determine affect on mixing efficiency.

In the second stage, these cellulose ester concentrates were mixed with a base rubber formulation using a Brabender batch mixer equipped with roller type high shear blades. The base rubber was a blend of a styrene butadiene rubber (Buna 5025-2, 89.4 pph) and polybutadiene rubber (Buna CB24, 35 pph). Mixing was performed at a set temperature of 160° C. and a starting rotor speed of 50 RPM. RPM was decreased as needed to minimize overheating due to excessive shear. The cellulose ester concentrate loading level was adjusted so that there was about 20 weight percent cellulose ester in the final mix.

For the Comparative Examples, cellulose ester and plasticizer (i.e., no rubber) were first combined together in a Brabender batch mixer equipped with roller high shear blades in order to form a masterbatch. Plasticizer was added to enhance flow and lower viscosity as it has been observed that high viscosity cellulose esters will not mix at the processing temperature of the rubber (i.e., 150 to 160° C.). Mixing was performed for approximately 10 to 15 minutes at 160° C. and 50 RPM. Upon completion, the sample was removed and cryo-ground to form a powder.

In the next stage, 20 weight percent of the cellulose ester/plasticizer masterbatch was added to the rubber formulation using the same Brabender mixer at 160° C. and 50 RPM. The masterbatch was added 30 seconds after the rubber compound had been fully introduced into the mixer. Mixing was performed for approximately 10 minutes after all ingredients had been added. The sample was then removed and tested.

The particle sizes in the dispersion were measured using a compound light microscope (typically 40×). The samples could be cryo-polished to improve image quality and the microscope could run in differential interference contrast mode to enhance contrast.

The glass transition temperatures were measured using a DSC with a scanning rate of 20° C./minute.

The base formulations for all samples tested and produced as described below are depicted in TABLES 6A, 6B, and 6C.

TABLE 4

| Grade | Type | Falling Ball Viscosity | Tg (° C.) | Melting Range (° C.) |
|---|---|---|---|---|
| CAB 381-0.1 | Cellulose acetate butyrate | 0.1 | 123 | 155-165 |
| CAB 381-0.5 | Cellulose acetate butyrate | 0.5 | 130 | 155-165 |
| CAB 381-2 | Cellulose acetate butyrate | 2 | 133 | 171-184 |
| CAB 381-6 | Cellulose acetate butyrate | 6 | 135 (est) | 184 to 190 (est) |
| CAB 381-20 | Cellulose acetate butyrate | 6 | 141 | 195-204 |
| CAP 482-0.5 | Cellulose acetate propionate | 0.5 | 142 | 188-210 |
| CAP 482-2 | Cellulose acetate propionate | 2 | 143 | 188-210 |
| CAP 482-6 | Cellulose acetate propionate | 6 | 144 (est) | 188-210 (est) |
| CAP 482-20 | Cellulose acetate propionate | 6 | 147 | 188-210 |
| CA 398-30 | Cellulose acetate | 30 | 180 | 230-250 |

TABLE 5

| Grade | Type | Styrene | MI @ 200° C. | Diblock content | Shore Hardness | MA bound |
|---|---|---|---|---|---|---|
| D1118KT | Diblock styrene/butadiene | 33 wt % | 10 | 78 | 74 | Na |
| D1102KT | Triblock styrene/butadiene | 28 wt % | 14 | 17 | 66 | Na |
| D1101KT | Triblock styrene/butadiene | 31 wt % | <1 | 16 wt % | 69 | Na |
| FG1924GT | Triblock, styrene ethylene/butylene | 13 wt % | 40 @ 230° C. | na | 49 | 0.7 to 1.3 wt % |
| FG1901G | Triblock, styrene ethylene/butylene | 30 wt % | 22 @ 230° C. | na | 71 | 1.4 to 2.0 wt % |

Example 3(a)

In this example, a cellulose ester concentrate was produced that contained 40 weight percent of Eastman CAB 381-0.1 and 60 weight percent of Kraton FG1924. The materials were compounded using a medium shear screw design at max zone temperatures of 200° C. and a residence time of less than one minute. The cellulose ester concentrate was combined with the base rubber formulation at a 50:50 weight ratio and mixed in a Brabender mixer. The final elastomeric composition contained 50 weight percent of base rubber, 30 weight percent of Kraton FG 1924, and 20 weight percent of CAB 381-0.1. The particles were evenly dispersed and had particle sizes of less than 1 micron.

Example 3(b)

In this example, a cellulose ester concentrate was produced that contained 60 weight percent of Eastman CAB 381-0.1 and 40 weight percent of Kraton FG1924. The materials were compounded using a medium shear screw design at max zone temperatures of 200° C. and a residence time less of than one minute. The cellulose ester concentrate was combined with the base rubber formulation at a 33.3/66.7 weight ratio and mixed in a Brabender mixer. The final formulation contained 66.7 weight percent of the base rubber, 13.3 weight percent of Kraton FG 1924, and 20 weight percent of CAB 381-0.1. The particles were evenly dispersed and had particle sizes of less than 3 microns, with most particles being less than 1 micron.

Example 3(c)

In this example, a cellulose ester concentrate was produced that contained 40 weight percent of Eastman CAB 381-0.5 and 60 weight percent of Kraton FG1924. The materials were compounded using a medium shear screw design at max zone temperatures of 225° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CAB 381-0.5. The particles were evenly dispersed and had a particle size less than 1 micron.

Example 3(d)

In this example, a cellulose ester concentrate was produced that contained 40 weight percent of Eastman CAB 381-2 and 60 weight percent of Kraton FG1924. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CAB 381-2. The particles were evenly dispersed and had particle sizes of less than 1 micron.

Example 3(e)

In this example, a cellulose ester concentrate was produced that contained 40 weight percent of Eastman CAB 381-0.1 and 60 weight percent of Kraton D1102. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton D1102, and 20 weight percent of CAB 381-0.1. The particles were evenly dispersed and had particle sizes of less than 3 microns.

Example 3(f)

In this example, a cellulose ester concentrate was produced that contained 40 weight percent of Eastman CAB 381-0.1 and 60 weight percent of Kraton D1101. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton D1101, and 20 weight percent of CAB 381-0.1. The particles were evenly dispersed and had particle sizes of less than 5 microns.

Example 3(g)

In this example, a cellulose ester concentrate was produced that contained 40 weight percent of Eastman CAB 381-0.1 and 60 weight percent of Kraton D1118. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton D1118, and 20 weight percent of CAB 381-0.1. The particles were evenly dispersed and had particle sizes less than 3 microns.

Example 3(h)

In this example, a cellulose ester concentrate was produced that contained 40 weight percent of Eastman CAP 482-0.5 and 60 weight percent of Kraton FG 1924. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CAP 482-0.5. The particles were evenly dispersed and had particle sizes of less than 1 micron.

Example 3(i)

In this example, a cellulose ester concentrate was produced that contained 40 weight percent of Eastman CA 398-3 and 60 weight percent of Kraton FG 1924. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CA 398-3. The particles were evenly dispersed and had particle sizes less than 3 microns.

Example 3(j)

In this example, a cellulose ester concentrate was produced that contained 40 weight of percent Eastman CAB 381-0.1 and 60 weight percent of Kraton FG1901. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1901, and 20 weight percent of CAB 381-0.1. The particles were evenly dispersed and had particle sizes of less than 1 micron.

Example 3(k)

In this example, a cellulose ester concentrate was produced that contained 40 weight percent of Eastman CAB 381-0.5 and 60 weight percent of Kraton FG1901. The materials were compounded using a medium shear screw design at max zone temperatures of 225° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent Kraton FG 1901, and 20 weight percent of CAB 381-0.5. The particles were evenly dispersed and had particle sizes of less than 1 micron.

Example 3(l)

In this example, a cellulose ester concentrate was produced that contained 40 weight percent of Eastman CAB 381-2 and 60 weight percent of Kraton FG1901. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1901, and 20 weight percent of CAB 381-2. The particles were evenly dispersed and had particle sizes of less than 1 micron.

Example 3(m)

In this example, a cellulose ester concentrate was produced that contained 40 weight percent of Eastman CAP 482-0.5 and 60 weight percent of Kraton FG1901. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1901, and 20 weight percent of CAP 482-0.5. The particles were evenly dispersed and had particle sizes of less than 3 microns.

Example 3(n)

In this example, a cellulose ester concentrate was produced that contained 40 weight percent of Eastman CA 398-3 and 60 weight percent of Kraton FG 1901. The materials were compounded using a medium shear screw design at max zone temperatures of 250° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1901, and 20 weight percent of CA 398-3. The particles were evenly dispersed and had particle sizes of less than 1 micron.

Example 3(o)

In this example, 67 weight percent of Eastman CAB 381-20 was melt blended with 33 weight percent of Eastman CAB 381-0.5 to produce an estimated CAB 381-6 material having a falling ball viscosity of 6. Subsequently, 40 weight percent of this cellulose ester blend was melt blended with 60 weight percent of Kraton FG 1924. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CAB 381-6. The particles were evenly dispersed and had particle sizes of less than 3 microns.

Example 3(p)

In this example, 67 weight percent of Eastman CAP 482-20 was melt blended with 33 weight percent of Eastman CAP 482-0.5 to produce an estimated CAP 482-6 material. Subsequently, 40 weight percent of this cellulose ester blend was melt blended with 60 weight percent of Kraton FG 1924. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton FG 1924, and 20 weight percent of CAP 482-6. The particles were evenly dispersed and had particle sizes of less than 1 micron.

Example 3(q)

In this example, 67 weight percent of Eastman CAP 482-20 was melt blended with 33 weight percent of Eastman CAP 482-0.5 to produce an estimated CAP 482-6 material. Subsequently, 40 weight percent of this cellulose ester blend was melt blended with 60 weight percent of Kraton D1102. The materials were compounded using a medium shear screw design at max zone temperatures of 200° C. and a residence time of less than one minute. The cellulose ester concentrate was combined with the base rubber formulation at a 50/50 weight ratio and mixed in a Brabender mixer. The final formulation contained 50 weight percent of base rubber, 30 weight percent of Kraton D1102, and 20 weight percent of CAP 482-6. The particles were evenly dispersed and had particle sizes of less than 5 microns.

Example 3(r)

In this example, 90 weight percent of Eastman CA 398-3 was melt blended with 10 weight percent of triphenyl phosphate to produce a plasticized cellulose acetate pre-blend. Subsequently, 40 weight percent of this plasticized cellulose acetate was melt blended with 60 weight percent Kraton D1102. The materials were compounded using a medium shear screw design at max zone temperatures of 200° C. and a residence time of less than one minute. The cellulose ester concentrate was combined with the base rubber formulation at a 66.7/33.3 weight ratio and mixed in a Brabender mixer. The final formulation contained 33.3 weight percent of base rubber, 40 weight percent of Kraton D1102, 20 weight percent of CA 398-3, and 6.67 weight percent triphenyl phosphate. The particles were evenly dispersed and had particle sizes of less than 3 microns.

Example 3(s)

In this example, 90 weight percent of Eastman CA 398-3 was melt blended with 10 weight percent of triphenyl phosphate to produce a plasticized cellulose acetate pre-blend. Subsequently, 40 weight percent of this plasticized cellulose acetate was melt blended with 60 weight percent of Kraton FG 1924. The materials were compounded using a medium shear screw design at max zone temperatures of 200° C. and a residence time of less than one minute. The cellulose ester concentrate was combined with the base rubber formulation at a 66.7/33.3 weight ratio and mixed in a Brabender mixer. The final formulation contained 33.3 weight percent of base rubber, 40 weight percent of Kraton FG 1924, 20 weight percent of CA 398-3, and 6.67 weight percent of triphenyl phosphate. The particles were evenly dispersed and had particle sizes of less than 1 micron.

Comparative Example 3(a)

In this example, a masterbatch was produced having 90 weight percent of Eastman CAB 381-0.1 and 10 weight percent of dioctyl adipate plasticizer. The CAB had a falling ball viscosity of 0.1 and the mixture had an estimated Tg of 95° C. The masterbatch was combined with the base rubber formulation at a 20/80 weight ratio and mixed in a Brabender mixer. This was done to simulate "direct mixing" as is currently practiced in the art. Most of the particles were evenly dispersed and had sizes predominantly between 5 and 10 microns; however, a few particles showed clustering in the 25 microns range.

Comparative Example 3(b)

Following the same procedure as in Comparative Example 3(a), an attempt was made to mix Eastman CA 398-3 powder without plasticizer into the rubber formulation. The CA had a falling ball viscosity of 3 and a Tg of approximately 180° C. Mixing could not be performed because the CA would not soften at the mixing temperature of 160° C.

Comparative Example 3(c)

Following the same procedure as in Comparative Example 3(a), a masterbatch was produced from a 50/50 mix of Eastman CA 398-3 and polyethylene glycol plasticizer. The high level of plasticizer was required in order to make the CA processable at 160° C. The Tg of the mixture was estimated to be less than 100° C. Particles partially dispersed but overall quality was poor with large clumps of cellulose acetate being present having particle sizes greater than 25 microns.

Comparative Example 3(d)

Following the same procedure as in Comparative Example 3(a), a masterbatch was produced from a 75/25 mix of Eastman CAP 482-0.5 and dioctyl adipate plasticizer. The high level of plasticizer was required in order to make the CAP processable at 160° C. The Tg of the mixture was estimated to be less than 100° C. Particles partially dispersed but overall quality was poor with large clumps of cellulose acetate propionate being present having particle sizes greater than 25 microns.

Comparative Example 3(e)

Following the same procedure as in Comparative Example 3(a), a masterbatch was produced from a 80/20 mix of Eastman CAP 482-0.5 and polyethylene glycol plasticizer. The high level of plasticizer was required in order to make the CAP processable at 160° C. The Tg of the mixture was estimated to be less than 100° C. Particles dispersed fairly well with most particles having sizes predominantly between 5 and 15 microns.

TABLE 6A

| | Example 3(a) | Example 3(b) | Example 3(c) | Example 3(d) | Example 3(e) | Example 3(f) | Example 3(g) | Example 3(h) | Example 3(i) | Example 3(j) | Example 3(k) |
|---|---|---|---|---|---|---|---|---|---|---|---|
| Cellulose Ester Concentrate Formulations ||||||||||||
| Cellulose Ester | 40 | 60 | 40 | 40 | 40 | 40 | 40 | 40 | 40 | 40 | 40 |
| Carrier Elastomer | 60 | 40 | 60 | 60 | 60 | 60 | 60 | 60 | 60 | 60 | 60 |
| Plasticizer | — | — | — | — | — | — | — | — | — | — | — |
| CE Concentrate (Total wt %) | 100 | 100 | 100 | 100 | 100 | 100 | 100 | 100 | 100 | 100 | 100 |
| Mixing Ratios for Elastomeric Compositions ||||||||||||
| Base Rubber | 50 | 66.7 | 50 | 50 | 50 | 50 | 50 | 50 | 50 | 50 | 50 |
| CE Concentrate | 50 | 33.3 | 50 | 50 | 50 | 50 | 50 | 50 | 50 | 50 | 50 |
| Elastomeric Composition (Total wt %) | 100 | 100 | 100 | 100 | 100 | 100 | 100 | 100 | 100 | 100 | 100 |
| Final Formulations of Produced Elastomeric Compositions ||||||||||||
| Cellulose Ester | 20 | 20 | 20 | 20 | 20 | 20 | 20 | 20 | 20 | 20 | 20 |
| Carrier Elastomer | 30 | 13.3 | 30 | 30 | 30 | 30 | 30 | 30 | 30 | 30 | 30 |
| Base Rubber | 50 | 66.7 | 50 | 50 | 50 | 50 | 50 | 50 | 50 | 50 | 50 |

TABLE 6A-continued

| | Example 3(a) | Example 3(b) | Example 3(c) | Example 3(d) | Example 3(e) | Example 3(f) | Example 3(g) | Example 3(h) | Example 3(i) | Example 3(j) | Example 3(k) |
|---|---|---|---|---|---|---|---|---|---|---|---|
| Dispersion Particle Size | <1 μm | <1 μm | <1 μm | <1 μm | <3 μm | <5 μm | <3 μm | <1 μm | <3 μm | <1 μm | <1 μm |

TABLE 6B

| | Example 3(l) | Example 3(m) | Example 3(n) | Example 3(o) | Example 3(p) | Example 3(q) | Example 3(r) | Example 3(s) | Comparative Example 3(a) | Comparative Example 3(b) |
|---|---|---|---|---|---|---|---|---|---|---|
| Cellulose Ester Concentrate Formulations | | | | | | | | | | |
| Cellulose Ester | 40 | 40 | 40 | 40 | 40 | 40 | 36 | 36 | 90 | — |
| Carrier Elastomer | 60 | 60 | 60 | 60 | 60 | 60 | 60 | 60 | — | — |
| Plasticizer | — | — | — | — | — | — | 4 | 4 | 10 | — |
| CE Concentrate (Total wt %) | 100 | 100 | 100 | 100 | 100 | 100 | 100 | 100 | 100 | — |
| Mixing Ratios for Elastomeric Compositions | | | | | | | | | | |
| Base Rubber | 50 | 50 | 50 | 50 | 50 | 50 | 33.3 | 33.3 | 80 | — |
| CE Concentrate | 50 | 50 | 50 | 50 | 50 | 50 | 66.7 | 66.7 | 20 | — |
| Elastomeric Composition (Total wt %) | 100 | 100 | 100 | 100 | 100 | 100 | 100 | 100 | 100 | — |
| Final Formulations of Produced Elastomeric Compositions | | | | | | | | | | |
| Cellulose Ester | 20 | 20 | 20 | 20 | 20 | 20 | 20 | 20 | 18 | — |
| Carrier Elastomer | 30 | 30 | 30 | 30 | 30 | 30 | 40 | 40 | — | — |
| Base Rubber | 50 | 50 | 50 | 50 | 50 | 50 | 33.3 | 33.3 | 80 | — |
| Plasticizer | — | — | — | — | — | — | 6.67 | 6.67 | 2 | — |
| Dispersion Particle Size | <1 μm | <3 μm | <1 μm | <3 μm | <1 μm | <5 μm | <3 μm | <1 μm | 5-10 μm | — |

TABLE 6C

| | Comparative Example 3(c) | Comparative Example 3(d) | Comparative Example 3(e) |
|---|---|---|---|
| Cellulose Ester Concentrate Formulations | | | |
| Cellulose Ester | 50 | 75 | 80 |
| Carrier Elastomer | — | — | — |
| Plasticizer | 50 | 25 | 20 |
| CE Concentrate (Total wt %) | 100 | 100 | 100 |
| Mixing Ratios for Elastomeric Compositions | | | |
| Base Rubber | 80 | 80 | 80 |
| CE Concentrate | 20 | 20 | 20 |
| Elastomeric Composition (Total wt %) | 100 | 100 | 100 |
| Final Formulations of Produced Elastomeric Compositions | | | |
| Cellulose Ester | 10 | 15 | 16 |
| Carrier Elastomer | — | — | — |
| Elastomer Base Rubber | 80 | 80 | 80 |
| Plasticizer | 10 | 5 | 4 |
| Dispersion Particle Size | >25 μm | >25 μm | 10-15 μm |

Example 4

This example shows the advantages of using modified cellulose esters with plasticizers in tire formulations compared to using only cellulose esters. TABLE 7 shows the tire formulations that were produced. TABLE 8 shows the cellulose ester/plasticizer masterbatch formulations that were produced. The elastomeric compositions were produced using the procedure parameters outlined in TABLES 7 and 9.

TABLE 9 depicts the mixing conditions of the three stages. The components were mixed in a Banbury mixer. After preparing the elastomeric compositions, the composition was cured for T90+5 minutes at 160° C.

TABLE 7

| Ingredient | Component | CAB-1 | CAB-2 | CAB-3 |
|---|---|---|---|---|
| STAGE 1 | | | | |
| Buna VSL 5025-2 | S-SBR extended with 37.5 phr TDAE | 103.12 | 103.12 | 103.12 |
| Buna CB24 | PBD Rubber | 25 | 25 | 25 |
| Rhodia 1165 MP | Silica | 70 | 70 | 70 |
| N234 | Carbon black | 15 | 15 | 15 |
| Si69 | Coupling agent | 5.47 | 5.47 | 5.47 |
| Sundex ® 790 | Aromatic oil | 5 | 5 | 5 |
| Stearic acid | Cure Activator | 1.5 | 1.5 | 1.5 |
| Product of Stage 1 | MB1 | 210.9 | 210.9 | 210.9 |

TABLE 8

| CE/Plasticizer Blends | CE | Tg before plasticizer | Plasticizer | Pz level (g/100 g CE) | Phr of MB in formulation | Tg after plasticizer |
|---|---|---|---|---|---|---|
| CE-MB1 | CAB 381-2 | 133° C. | — | — | 10 | 133° C. |
| CE-MB2 | CAB 381-2 | 133° C. | EMN 168 | 25 | 12.5 | 95° C. |
| CE-MB3 | CAB 381-2 | 133° C. | PEG-300 | 25 | 12.5 | 70° C. |

TABLE 9

| | STAGE 1 | STAGE 2 | STAGE 3 |
|---|---|---|---|
| Start Temperature | 65° C. | 65° C. | 50° C. |
| Starting Rotor Speed (RPM) | 65 | 65 | 60 |
| Fill Factor | 67% | 64% | 61% |
| Mix Sequence | Add elastomers | Add half of first master batch | Add half of second master batch |
| | After 1 minute, add ⅔ silica + Si69 | After 15 seconds, add other components and other half of first master batch | |
| | After 2 minutes, add ⅓ silica + other components | After 1 minute, sweep | After 15 seconds, add sulfur, accelerator package, and other half of second master batch |
| | After 3 minutes, sweep | After 1.5 minutes, adjust rotor speed to increase temperature to between 140 and 145° C. | After 1 minute, sweep |
| | After 3.5 minutes, adjust rotor speed to increase temperature to 160° C. | | |
| Dump Conditions | Hold for 2 minutes at 160° C. | Hold for 4 minutes at 140 to 145° C. | Hold for 2.5 minutes at 110° C. |
| Total Time | 6.5 minutes | 7.5 minutes | 3.75 minutes |

TABLE 7-continued

| Ingredient | Component | CAB-1 | CAB-2 | CAB-3 |
|---|---|---|---|---|
| STAGE 2 | | | | |
| Product of Stage 1 | MB1 | 210.9 | 210.9 | 210.9 |
| CE/Plasticizer Blends | CE-MB1 | 10 | — | — |
| | CE-MB2 | — | 12.5 | — |
| | CE-MB3 | — | — | 12.5 |
| Si 69 | Coupling agent | 0.546 | 1.17 | — |
| Zinc oxide | Cure activator | 1.9 | 1.9 | 1.9 |
| Okerin ® Wax 7240 | Microcrystalline wax | 1.5 | 1.5 | 1.5 |
| Santoflex ® 6PPD | Antioxidant | 2 | 2 | 2 |
| Strutkol ® KK49 | Processing Aid | 2 | 2 | 2 |
| Product of Stage 2 | MB2 | 217.49 | 229.99 | 229.99 |
| STAGE 3 | | | | |
| Product of Stage 2 | MB2 | 217.49 | 229.99 | 229.99 |
| Sulfur | Cross-linker | 1.5 | 1.5 | 1.5 |
| Santocure ® CBS | Accelerator | 1.3 | 1.3 | 1.3 |
| Perkacit ® DPG-grs | Accelerator | 1.5 | 1.5 | 1.5 |
| TOTAL | | 221.79 | 234.29 | 234.29 |

Example 5

Various performance properties of the elastomeric compositions produced in Example 4 were tested. Descriptions of the various analytical techniques used to measure performance are provided below.

The break stress and break strain were measured as per ASTM D412 using a Die C for specimen preparation. The specimen had a width of 1 inch and a length of 4.5 inches. The speed of testing was 20 inches/min and the gauge length was 63.5 mm (2.5 inch). The samples were conditioned in the lab for 40 hours at 50%+/−5% humidity and at 72° F. (22° C.).

The Mooney Viscosities were measured according to ASTM D 1646.

The Phillips Dispersion Rating was calculated by cutting the samples with a razor blade and subsequently taking pictures at 30× magnification with an Olympus SZ60 Zoom Stereo Microscope interfaced with a Paxcam Arc digital camera and a Hewlett Packard 4600 color printer. The pictures of the samples were then compared to a Phillips standard dispersion rating chart having standards ranging from 1 (bad) to 10 (excellent).

Mechanical Properties: modulus at 100% and 300% strains were measured as per ASTM D412 using Die C for specimen preparation. The speed of testing was 20 inches/min and the gauge length was 63.5 mm (2.5 inch). The samples were conditioned in the lab for 40 hours at 50%+/−5 humidity and 72° F. The width of specimen was 1 inch, and length was 4.5 inch.

Hardness: Shore A hardness was measured according to ASTM D2240.

Temperature Sweep: A TA instruments Dynamic Mechanical Analyzer was used to complete the temperature sweeps using tensile geometry. Storage modulus (E'), loss modulus (E"), and tan delta (=E"/E') were measured as a function of temperature from −80° C. to 120° C. using 10 Hz frequency, 5% static, and 0.2% dynamic strain.

Rebound Test: The rebound pendulum test was carried out as per ASTM D7121-05.

Wear: Din abrasion testing was performed per ASTM 222.

The data shows that without the use of a plasticizer, the cellulose ester did not disperse as well through the elastomer as shown by the poor Phillips Dispersion data. Further, the Mooney Viscosities of the compositions containing both cellulose ester and plasticizer were lower than when plasticizer was not utilized. This shows that in the presence of the plasticizer, cellulose esters acted as a processing aid and lowered Mooney viscosity. Furthermore, the break stress and wear was also improved over compositions without plasticizer, presumably indicating that in presence of the plasticizers, cellulose esters can disperse into finer particles and improve the properties that are dependent on particle size and/or surface area.

TABLE 10

| Properties | CAB-1 | CAB-2 | CAB-3 |
| --- | --- | --- | --- |
| Uncured Rubber | | | |
| Mooney viscosity | 63.5 | 58.5 | 55.1 |
| Cured Rubber | | | |
| Phillips Dispersion | 1 | 4 | 4 |
| Break stress, psi | 2191 | 2240 | 2349 |
| Break strain, % | 386 | 387 | 366 |
| Modulus(M100), psi | 663 | 679 | 735 |
| Modulus (M300), psi | 1693 | 1723 | 1918 |
| Shore A Hardness | 61 | 59 | 62 |
| Tan Delta 0° C. | 0.306 | 0.292 | 0.313 |
| Tan Delta 60° C. | 0.082 | 0.081 | 0.076 |
| Rebound 0° C., % | 9.8 | 10.8 | 9.6 |
| Rebound 60° C., % | 62.2 | 62.8 | 64.0 |
| Wear, volume loss in mm$^3$ | 136 | 124 | 127 |

That which is claimed is:

1. A tire component comprising an elastomeric composition containing at least one non-fibril cellulose ester, at least one non-nitrile primary elastomer, and at least 70 parts per hundred rubber (phr) of one or more fillers, wherein a starch is absent in said elastomeric composition, wherein said elastomeric composition exhibits a molded groove tear as measured according to ASTM D624 of at least 130 lbf/in, and wherein at least a portion of said at least one non-fibril cellulose ester is dispersed in said at least one non-nitrile primary elastomer, wherein said at least one non-nitrile primary elastomer forms a continuous phase and at least a portion of said at least one non-fibril cellulose ester forms a dispersed phase.

2. The tire component according to claim 1 wherein said tire component comprises a tire tread, tire subtread, tire undertread, body plies, belts, overlay cap plies, belt wedges, shoulder inserts, tire apex, tire sidewalls, and/or bead fillers.

3. The tire component according to claim 1 wherein said tire component comprises a tire tread, tire subtread, tire undertread, and/or tire sidewall.

4. The tire component according to claim 1 wherein said elastomeric composition comprises at least 1 and not more than 75 phr of said at least one non-fibril cellulose ester.

5. The tire component according to claim 1 wherein said elastomeric composition comprises at least 75 phr and/or not more than 150 phr of said one or more fillers.

6. The tire component according to claim 1 wherein said elastomeric composition comprises at least 85 phr and/or not more than 130 phr of said one or more fillers.

7. The tire component according to claim 1 wherein said one or more fillers comprise silica, carbon black, clay, alumina, talc, mica, discontinuous fibers including cellulose fibers and glass fibers, aluminum silicate, aluminum trihydrate, barites, feldspar, nepheline, antimony oxide, calcium carbonate, kaolin, and combinations thereof.

8. The tire component according to claim 1 wherein said at least one non-fibril cellulose ester is in the form of particles having an average diameter of not more than 10 μm, wherein at least 75 percent of said particles have an aspect ratio of not more than 2:1.

9. The tire component according to claim 1 wherein said at least one non-fibril cellulose ester is in the form of particles having an average diameter of not more than 10 μm, wherein at least 75 percent of said particles have a particle size of not more than 8 μm.

10. The tire component according to claim 1 wherein said elastomeric composition exhibits a Mooney viscosity at 100° C. as measured according to ASTM D 1646 of not more than 110 AU when said elastomeric composition is uncured.

11. The tire component according to claim 1 wherein said elastomeric composition exhibits a DMA strain sweep modulus as measured at 5% strain and 30° C. of at least 1,400,000 Pa.

12. The tire component according to claim 1 wherein said at least one non-fibril cellulose ester is selected from the group consisting of cellulose acetate, cellulose acetate propionate, cellulose acetate, butyrate cellulose triacetate, cellulose tripropionate, cellulose tributyrate, and mixtures thereof.

13. The tire component according to claim 1 wherein said at least one non-nitrile primary elastomer is non-polar.

14. The tire component according to claim 1 wherein said at least one non-nitrile primary elastomer is selected from the group consisting of natural rubber, polybutadiene, polyisoprene, styrene-butadiene rubber, polyolefins, ethylene propylene diene monomer (EPDM), polynorbornene, and combinations thereof.

15. The tire component according to claim 1 wherein said at least one non-fibril cellulose ester is a modified cellulose ester that has been modified by at least one plasticizer.

16. The tire component according to claim 15 wherein said at least one plasticizer forms at least 1 and not more than 60 weight percent of said modified cellulose ester.

17. The tire component according to claim 15 wherein said at least one plasticizer is one selected from the group consisting of a phosphate plasticizer, benzoate plasticizer, adipate plasticizer, a phthalate plasticizer, a glycolic acid ester, a citric acid ester plasticizer, and a hydroxyl-functional plasticizer.

18. The tire component according to claim 15 wherein said at least one plasticizer is selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

19. The tire component according to claim 1 wherein said at least one non-fibril cellulose ester is dispersed in said at least one non-nitrile primary elastomer, wherein said at least one non-nitrile primary elastomer forms a continuous phase and said at least one non-fibril cellulose ester forms a dispersed phase.

* * * * *